US011082701B2

(12) United States Patent
Liu et al.

(10) Patent No.: US 11,082,701 B2
(45) Date of Patent: *Aug. 3, 2021

(54) METHODS AND DEVICES FOR DYNAMIC ADAPTATION OF ENCODING BITRATE FOR VIDEO STREAMING

(71) Applicant: GOOGLE LLC, Mountain View, CA (US)

(72) Inventors: Guangshuo Liu, Los Altos, CA (US); Hilary Roache, Mountain View, CA (US); Yifeng Huang, San Jose, CA (US); Siddarth Raghunathan, Castro Valley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,755

(22) Filed: Dec. 10, 2019

(65) Prior Publication Data
US 2020/0112726 A1    Apr. 9, 2020

Related U.S. Application Data

(63) Continuation of application No. 15/167,957, filed on May 27, 2016, now Pat. No. 10,506,237.

(51) Int. Cl.
*H04N 19/147* (2014.01)
*H04N 19/17* (2014.01)
*H04N 19/184* (2014.01)

(52) U.S. Cl.
CPC .......... *H04N 19/147* (2014.11); *H04N 19/17* (2014.11); *H04N 19/184* (2014.11)

(58) Field of Classification Search
CPC .... H04N 19/115; H04N 7/185; H04N 19/179; H04N 19/61; H04N 7/181; H04N 19/40;
(Continued)

(56) References Cited

U.S. PATENT DOCUMENTS 4,198,653 A   4/1980   Kamin
4,737,847 A   4/1988   Araki et al.
(Continued)

FOREIGN PATENT DOCUMENTS

EP          1024666        8/2000
WO     WO 2009/138037    11/2000

OTHER PUBLICATIONS

Birk, Deterministic Load-Balancing Schemes for Disk-Based Video-on-Demand Storage Servers, 14 IEEE Symposium on Mass Storage Systems, Sep. 1995, pp. 17-25.
(Continued)

*Primary Examiner* — Dramos Kalapodas
(74) *Attorney, Agent, or Firm* — Colby Nipper PLLC

(57) ABSTRACT

The various embodiments described herein include a method performed at a camera device. The method includes: encoding a first stream of images from the camera device with a first bitrate; transmitting the encoded first stream of images to a server system; determining, at the camera device, one or more transmission metrics for the transmitted first stream of images; based on the one or more transmission metrics, encoding a second stream of images from the camera device with a second bitrate distinct from the first bitrate; and transmitting the encoded second stream of images to the server system.

20 Claims, 19 Drawing Sheets

(58) Field of Classification Search
CPC .... H04N 19/14; H04N 19/147; H04N 19/184; H04N 19/17; H04N 21/2402; H04N 21/4223; H04N 21/2743; H04N 21/2343; H04N 19/152; H04N 19/164; H04N 19/162; H04N 19/172; G08B 13/19667; G08B 13/19656; H04L 65/607; H04L 65/80; H04L 65/602
See application file for complete search history.

(56) References Cited

U.S. PATENT DOCUMENTS

| | | |
|---|---|---|
| 5,237,408 A | 8/1993 | Blum et al. |
| 5,396,284 A | 3/1995 | Freeman |
| 5,627,586 A | 5/1997 | Yamasaki |
| 5,854,902 A | 12/1998 | Wilson et al. |
| 5,956,424 A | 9/1999 | Wootton et al. |
| 5,969,755 A | 10/1999 | Courtney |
| 6,028,626 A | 2/2000 | Aviv |
| 6,046,745 A | 4/2000 | Moriya et al. |
| 6,104,831 A | 8/2000 | Ruland |
| 6,107,918 A | 8/2000 | Klein et al. |
| 6,144,375 A | 11/2000 | Jain et al. |
| 6,236,395 B1 | 5/2001 | Sezan et al. |
| D450,059 S | 11/2001 | Itou |
| 6,366,296 B1 | 4/2002 | Boreczky et al. |
| 6,400,378 B1 | 6/2002 | Snook |
| 6,424,370 B1 | 7/2002 | Courtney |
| 6,476,858 B1 | 11/2002 | Ramirez Diaz et al. |
| 6,496,598 B1 | 12/2002 | Harman |
| 6,535,793 B2 | 3/2003 | Allard |
| 6,571,050 B1 | 5/2003 | Park |
| 6,600,784 B1 | 7/2003 | Divakaran et al. |
| 6,611,653 B1 | 8/2003 | Kim et al. |
| 6,628,835 B1 | 9/2003 | Brill et al. |
| 6,643,416 B1 | 11/2003 | Daniels et al. |
| 6,647,200 B1 | 11/2003 | Tanaka |
| 6,665,423 B1 | 12/2003 | Mehrotra et al. |
| 6,680,748 B1 | 1/2004 | Monti |
| 6,697,103 B1 | 2/2004 | Fernandez et al. |
| 6,727,938 B1 | 4/2004 | Randall |
| 6,741,977 B1 | 5/2004 | Nagaya et al. |
| D491,956 S | 6/2004 | Ombao et al. |
| 6,792,676 B2 | 9/2004 | Haji et al. |
| 6,816,184 B1 | 11/2004 | Brill et al. |
| D499,740 S | 12/2004 | Ombao et al. |
| 6,954,859 B1 | 10/2005 | Simerly et al. |
| 6,970,183 B1 | 11/2005 | Monroe |
| 7,016,415 B2 | 3/2006 | Alvarez |
| 7,023,469 B1 | 4/2006 | Olson |
| 7,142,600 B1 | 11/2006 | Schonfeld et al. |
| D555,661 S | 11/2007 | Kim |
| 7,403,116 B2 | 7/2008 | Bittner |
| 7,421,455 B2 | 9/2008 | Hua et al. |
| 7,421,727 B2 | 9/2008 | Oya et al. |
| 7,433,493 B1 | 10/2008 | Miyoshi et al. |
| 7,440,613 B2 | 10/2008 | Xu |
| 7,447,337 B2 | 11/2008 | Zhang et al. |
| D590,412 S | 4/2009 | Saft et al. |
| D607,001 S | 12/2009 | Ording |
| 7,629,995 B2 | 12/2009 | Salivar et al. |
| 7,649,938 B2 | 1/2010 | Chen et al. |
| 7,685,519 B1 | 3/2010 | Duncan |
| 7,760,908 B2 | 7/2010 | Curtner et al. |
| 7,765,482 B2 | 7/2010 | Wood et al. |
| D621,413 S | 8/2010 | Rasmussen |
| D625,323 S | 10/2010 | Matsushima et al. |
| 7,813,525 B2 | 10/2010 | Aggarwal |
| 7,823,066 B1 | 10/2010 | Kuramura |
| 7,920,626 B2 | 4/2011 | Fernandez et al. |
| 7,924,323 B2 | 4/2011 | Walker et al. |
| D638,025 S | 5/2011 | Saft et al. |
| 7,995,096 B1 | 8/2011 | Cressy et al. |
| 8,115,623 B1 | 2/2012 | Green |
| 8,122,038 B2 | 2/2012 | Handy et al. |
| 8,130,839 B2 | 3/2012 | Kawashima et al. |
| 8,200,669 B1 | 6/2012 | Iampietro et al. |
| 8,204,273 B2 | 6/2012 | Chambers et al. |
| 8,284,258 B1 | 10/2012 | Cetin et al. |
| 8,290,038 B1* | 10/2012 | Wang ................ H04N 19/14 375/240.02 |
| 8,295,597 B1 | 10/2012 | Sharma et al. |
| 8,300,890 B1 | 10/2012 | Gaikwad et al. |
| 8,305,447 B1 | 11/2012 | Wong |
| 8,305,914 B2 | 11/2012 | Thielman et al. |
| 8,379,851 B2 | 2/2013 | Mehrotra et al. |
| 8,390,684 B2 | 3/2013 | Piran et al. |
| 8,401,232 B2 | 3/2013 | Fan |
| 8,494,234 B1 | 7/2013 | Bozinovic et al. |
| 8,515,128 B1 | 8/2013 | Hildreth |
| 8,525,665 B1 | 9/2013 | Trundle et al. |
| 8,537,219 B2 | 9/2013 | Desimone et al. |
| 8,577,091 B2 | 11/2013 | Ivanov et al. |
| 8,587,653 B1 | 11/2013 | Vidunas et al. |
| 8,613,070 B1 | 12/2013 | Borzycki et al. |
| 8,639,796 B2 | 1/2014 | Covell et al. |
| 8,676,493 B2 | 3/2014 | M et al. |
| 8,683,013 B2* | 3/2014 | Major ................ H04L 65/608 709/219 |
| 8,688,483 B2 | 4/2014 | Watts |
| 8,707,194 B1 | 4/2014 | Jenkins et al. |
| 8,775,242 B2 | 7/2014 | Tavares et al. |
| 8,780,201 B1 | 7/2014 | Scalisi et al. |
| 8,854,457 B2 | 10/2014 | De Vleeschouwer et al. |
| 8,902,085 B1 | 12/2014 | Ray et al. |
| 8,922,659 B2* | 12/2014 | Leny ................ H04N 7/181 348/159 |
| 8,941,733 B2 | 1/2015 | Albers et al. |
| 8,941,736 B1 | 1/2015 | Scalisi |
| 8,942,438 B2 | 1/2015 | Ivanov et al. |
| 8,953,848 B2 | 2/2015 | Ivanov et al. |
| 8,958,602 B1 | 2/2015 | Lane et al. |
| 8,966,368 B2 | 2/2015 | Kuramura |
| 8,982,141 B2 | 3/2015 | Freyhult |
| 9,014,429 B2 | 4/2015 | Badawy |
| 9,025,836 B2 | 5/2015 | Ptucha |
| 9,064,393 B2 | 6/2015 | He |
| 9,082,018 B1 | 7/2015 | Laska |
| 9,124,858 B2 | 9/2015 | Jang et al. |
| 9,158,974 B1 | 10/2015 | Laska et al. |
| 9,172,911 B2 | 10/2015 | Kristiansen et al. |
| 9,213,903 B1 | 12/2015 | Laska et al. |
| 9,269,243 B2 | 2/2016 | Shet et al. |
| 9,307,217 B1 | 4/2016 | Day |
| 9,325,905 B2 | 4/2016 | Noyes |
| 9,361,011 B1 | 6/2016 | Burns et al. |
| 9,420,331 B2 | 8/2016 | Laska et al. |
| 9,449,229 B1 | 9/2016 | Laska et al. |
| 9,479,822 B2 | 10/2016 | Laska et al. |
| 9,516,053 B1 | 12/2016 | Muddu et al. |
| 9,575,178 B2 | 2/2017 | Kanamori et al. |
| 9,582,157 B1* | 2/2017 | Chatterjee ............ G06F 16/738 |
| 9,584,710 B2 | 2/2017 | Marman et al. |
| D782,495 S | 3/2017 | Laska et al. |
| 9,600,723 B1 | 3/2017 | Pantofaru et al. |
| 9,602,860 B2 | 3/2017 | Laska et al. |
| 9,613,524 B1 | 4/2017 | Lamb et al. |
| 9,621,798 B2 | 4/2017 | Zhang et al. |
| 9,674,453 B1 | 6/2017 | Tangeland et al. |
| 9,753,994 B2 | 9/2017 | Anderson |
| 9,940,523 B2 | 4/2018 | Laska |
| 9,997,053 B2 | 6/2018 | Maneskiold et al. |
| 10,063,815 B1 | 8/2018 | Spivey et al. |
| 10,108,862 B2 | 10/2018 | Laska et al. |
| 10,289,917 B1 | 5/2019 | Fu et al. |
| 10,506,237 B1 | 12/2019 | Liu |
| 2001/0010541 A1 | 8/2001 | Fernandez et al. |
| 2001/0019631 A1 | 9/2001 | Ohsawa et al. |
| 2001/0024517 A1 | 9/2001 | Labelle |
| 2001/0043721 A1 | 11/2001 | Kravets et al. |
| 2001/0050712 A1 | 12/2001 | Dunton et al. |
| 2002/0002425 A1 | 1/2002 | Dossey et al. |
| 2002/0030740 A1 | 3/2002 | Arazi et al. |
| 2002/0054068 A1 | 5/2002 | Ellis et al. |

(56) References Cited

U.S. PATENT DOCUMENTS

| | | |
|---|---|---|
| 2002/0054211 A1 | 5/2002 | Edelson et al. |
| 2002/0089549 A1 | 7/2002 | Munro et al. |
| 2002/0113813 A1 | 8/2002 | Yoshimine |
| 2002/0125435 A1 | 9/2002 | Cofer et al. |
| 2002/0126224 A1 | 9/2002 | Lienhart |
| 2002/0168084 A1 | 11/2002 | Trajkovic et al. |
| 2002/0174367 A1 | 11/2002 | Kimmel et al. |
| 2003/0025599 A1 | 2/2003 | Monroe |
| 2003/0035592 A1 | 2/2003 | Cornog et al. |
| 2003/0040815 A1 | 2/2003 | Pavlidis |
| 2003/0043160 A1 | 3/2003 | Elfying et al. |
| 2003/0053658 A1 | 3/2003 | Pavlidis |
| 2003/0058339 A1 | 3/2003 | Trajkovic et al. |
| 2003/0063093 A1 | 4/2003 | Howard |
| 2003/0095183 A1 | 5/2003 | Roberts et al. |
| 2003/0103647 A1 | 6/2003 | Rui et al. |
| 2003/0133503 A1 | 7/2003 | Paniconi et al. |
| 2003/0135525 A1 | 7/2003 | Huntington et al. |
| 2003/0218696 A1 | 11/2003 | Bagga et al. |
| 2004/0032494 A1 | 2/2004 | Ito et al. |
| 2004/0060063 A1 | 3/2004 | Russ et al. |
| 2004/0100560 A1 | 5/2004 | Stavely et al. |
| 2004/0109059 A1 | 6/2004 | Kawakita |
| 2004/0123328 A1 | 6/2004 | Coffey et al. |
| 2004/0125133 A1 | 7/2004 | Pea et al. |
| 2004/0125908 A1 | 7/2004 | Cesmeli |
| 2004/0133647 A1 | 7/2004 | Ozkan et al. |
| 2004/0143602 A1 | 7/2004 | Ruiz et al. |
| 2004/0145658 A1 | 7/2004 | Lev-Ran et al. |
| 2004/0174434 A1 | 9/2004 | Walker et al. |
| 2004/0196369 A1 | 10/2004 | Fukasawa et al. |
| 2005/0005308 A1 | 1/2005 | Logan et al. |
| 2005/0018879 A1 | 1/2005 | Ito et al. |
| 2005/0036658 A1 | 2/2005 | Gibbins et al. |
| 2005/0046699 A1 | 3/2005 | Oya et al. |
| 2005/0047672 A1 | 3/2005 | Ben-Ezra et al. |
| 2005/0074140 A1 | 4/2005 | Grasso et al. |
| 2005/0078868 A1 | 4/2005 | Chen et al. |
| 2005/0104727 A1 | 5/2005 | Han et al. |
| 2005/0104958 A1 | 5/2005 | Egnal et al. |
| 2005/0110634 A1 | 5/2005 | Salcedo et al. |
| 2005/0132414 A1 | 6/2005 | Bentley et al. |
| 2005/0146605 A1 | 7/2005 | Lipton et al. |
| 2005/0151851 A1 | 7/2005 | Schnell |
| 2005/0157949 A1 | 7/2005 | Aiso et al. |
| 2005/0162515 A1 | 7/2005 | Venetianer et al. |
| 2005/0169367 A1 | 8/2005 | Venetianer et al. |
| 2005/0195331 A1 | 9/2005 | Sugano |
| 2005/0246119 A1 | 11/2005 | Koodali |
| 2006/0005281 A1 | 1/2006 | Shinozaki et al. |
| 2006/0007051 A1 | 1/2006 | Bear et al. |
| 2006/0028548 A1 | 2/2006 | Salivar et al. |
| 2006/0029363 A1 | 2/2006 | Iggulden et al. |
| 2006/0045185 A1 | 3/2006 | Kiryati et al. |
| 2006/0045354 A1 | 3/2006 | Hanna et al. |
| 2006/0053342 A1 | 3/2006 | Bazakos et al. |
| 2006/0056056 A1 | 3/2006 | Ahiska et al. |
| 2006/0067585 A1 | 3/2006 | Pace |
| 2006/0070108 A1 | 3/2006 | Renkis |
| 2006/0072014 A1 | 4/2006 | Geng et al. |
| 2006/0072847 A1 | 4/2006 | Chor et al. |
| 2006/0075235 A1 | 4/2006 | Renkis |
| 2006/0093998 A1 | 5/2006 | Vertegaal |
| 2006/0109341 A1 | 5/2006 | Evans |
| 2006/0117371 A1* | 6/2006 | Margulis ............... H04N 7/106 725/131 |
| 2006/0148528 A1 | 7/2006 | Jung et al. |
| 2006/0164561 A1 | 7/2006 | Lacy et al. |
| 2006/0171453 A1 | 8/2006 | Rohlfing et al. |
| 2006/0195716 A1 | 8/2006 | Bittner |
| 2006/0227862 A1 | 10/2006 | Campbell et al. |
| 2006/0227997 A1 | 10/2006 | Au et al. |
| 2006/0228015 A1 | 10/2006 | Brockway et al. |
| 2006/0233448 A1 | 10/2006 | Pace et al. |
| 2006/0239645 A1 | 10/2006 | Curtner et al. |
| 2006/0243798 A1 | 11/2006 | Kundu et al. |
| 2006/0285596 A1 | 12/2006 | Kondo |
| 2006/0291694 A1 | 12/2006 | Venetianer et al. |
| 2007/0002141 A1 | 1/2007 | Lipton et al. |
| 2007/0008099 A1 | 1/2007 | Kimmel et al. |
| 2007/0014554 A1 | 1/2007 | Sasaki |
| 2007/0027365 A1 | 2/2007 | Kosted |
| 2007/0033632 A1 | 2/2007 | Baynger et al. |
| 2007/0035622 A1 | 2/2007 | Hanna et al. |
| 2007/0041727 A1 | 2/2007 | Lee et al. |
| 2007/0058040 A1 | 3/2007 | Zhang et al. |
| 2007/0061862 A1 | 3/2007 | Berger et al. |
| 2007/0086669 A1 | 4/2007 | Berger et al. |
| 2007/0101269 A1 | 5/2007 | Hua et al. |
| 2007/0132558 A1 | 6/2007 | Rowe et al. |
| 2007/0220569 A1 | 9/2007 | Ishii |
| 2007/0223874 A1 | 9/2007 | Hentschel |
| 2007/0255742 A1 | 11/2007 | Perez et al. |
| 2007/0257986 A1 | 11/2007 | Ivanov et al. |
| 2007/0268369 A1 | 11/2007 | Amano et al. |
| 2008/0005269 A1 | 1/2008 | Knighton et al. |
| 2008/0043106 A1 | 2/2008 | Hassapis et al. |
| 2008/0044085 A1 | 2/2008 | Yamamoto |
| 2008/0051648 A1 | 2/2008 | Suri et al. |
| 2008/0122926 A1 | 5/2008 | Zhou et al. |
| 2008/0129498 A1 | 6/2008 | Howarter et al. |
| 2008/0170123 A1 | 7/2008 | Albertson et al. |
| 2008/0178069 A1 | 7/2008 | Stallings |
| 2008/0181453 A1 | 7/2008 | Xu |
| 2008/0184245 A1 | 7/2008 | St-Jean |
| 2008/0192129 A1 | 8/2008 | Walker et al. |
| 2008/0225952 A1 | 9/2008 | Wang et al. |
| 2008/0231706 A1 | 9/2008 | Connell et al. |
| 2008/0240579 A1 | 10/2008 | Enomoto |
| 2008/0244453 A1 | 10/2008 | Cafer |
| 2008/0247601 A1 | 10/2008 | Ito et al. |
| 2008/0270363 A1 | 10/2008 | Hunt et al. |
| 2008/0303903 A1 | 12/2008 | Bentley et al. |
| 2008/0316311 A1 | 12/2008 | Albers et al. |
| 2009/0006368 A1 | 1/2009 | Mei et al. |
| 2009/0016599 A1 | 1/2009 | Eaton et al. |
| 2009/0018996 A1 | 1/2009 | Hunt et al. |
| 2009/0033746 A1 | 2/2009 | Brown et al. |
| 2009/0059031 A1 | 3/2009 | Miyakoshi |
| 2009/0060352 A1 | 3/2009 | Distante et al. |
| 2009/0080853 A1 | 3/2009 | Chen |
| 2009/0083787 A1 | 3/2009 | Morris |
| 2009/0100007 A1 | 4/2009 | Campbell et al. |
| 2009/0102924 A1 | 4/2009 | Masten, Jr. |
| 2009/0103622 A1 | 4/2009 | Tripathi et al. |
| 2009/0128632 A1 | 5/2009 | Goto et al. |
| 2009/0141939 A1 | 6/2009 | Chambers et al. |
| 2009/0154353 A1* | 6/2009 | Loiacono ............ H04L 47/2416 370/235 |
| 2009/0154806 A1 | 6/2009 | Chang et al. |
| 2009/0158308 A1 | 6/2009 | Weitzenfeld et al. |
| 2009/0207257 A1 | 8/2009 | Jung et al. |
| 2009/0208181 A1 | 8/2009 | Cottrell |
| 2009/0213937 A1 | 8/2009 | Kawase et al. |
| 2009/0232416 A1 | 9/2009 | Murashita |
| 2009/0244291 A1 | 10/2009 | Saptharishi |
| 2009/0244309 A1 | 10/2009 | Maison et al. |
| 2009/0249247 A1 | 10/2009 | Tseng et al. |
| 2009/0262189 A1 | 10/2009 | Marman |
| 2009/0273711 A1 | 11/2009 | Chapdelaine et al. |
| 2009/0278934 A1 | 11/2009 | Ecker et al. |
| 2009/0288011 A1 | 11/2009 | Piran et al. |
| 2009/0292549 A1 | 11/2009 | Ma et al. |
| 2009/0316956 A1 | 12/2009 | Higuchi et al. |
| 2009/0319829 A1 | 12/2009 | Takayama |
| 2010/0002070 A1 | 1/2010 | Ahiska |
| 2010/0002071 A1 | 1/2010 | Ahiska |
| 2010/0002911 A1 | 1/2010 | Wu et al. |
| 2010/0004839 A1 | 1/2010 | Yokoyama et al. |
| 2010/0013943 A1 | 1/2010 | Thorn |
| 2010/0023865 A1 | 1/2010 | Fulker et al. |
| 2010/0026802 A1 | 2/2010 | Titus et al. |
| 2010/0033573 A1 | 2/2010 | Malinovski et al. |
| 2010/0455594 | 2/2010 | Jenks et al. |

(56) References Cited

U.S. PATENT DOCUMENTS

| | | |
|---|---|---|
| 2010/0060715 A1 | 3/2010 | Laasik et al. |
| 2010/0098165 A1 | 4/2010 | Farfade et al. |
| 2010/0114623 A1 | 5/2010 | Bobbitt et al. |
| 2010/0128927 A1 | 5/2010 | Ikenoue |
| 2010/0133008 A1 | 6/2010 | Gawski et al. |
| 2010/0141763 A1 | 6/2010 | Rah et al. |
| 2010/0162114 A1 | 6/2010 | Roth |
| 2010/0166260 A1 | 7/2010 | Huang et al. |
| 2010/0192212 A1 | 7/2010 | Raleigh |
| 2010/0201815 A1 | 8/2010 | Anderson et al. |
| 2010/0205203 A1 | 8/2010 | Anderson et al. |
| 2010/0210240 A1 | 8/2010 | Mahaffey et al. |
| 2010/0245107 A1 | 9/2010 | Fulker et al. |
| 2010/0288468 A1 | 11/2010 | Patel et al. |
| 2010/0290668 A1 | 11/2010 | Friedman et al. |
| 2010/0304731 A1 | 12/2010 | Bratton et al. |
| 2011/0001605 A1 | 1/2011 | Kiani et al. |
| 2011/0035054 A1 | 2/2011 | Gal et al. |
| 2011/0050901 A1 | 3/2011 | Oya |
| 2011/0058708 A1 | 3/2011 | Ikenoue |
| 2011/0069175 A1 | 3/2011 | Mistretta et al. |
| 2011/0107364 A1 | 5/2011 | Lajoie et al. |
| 2011/0149078 A1 | 6/2011 | Fan et al. |
| 2011/0157358 A1 | 6/2011 | Bell |
| 2011/0167369 A1 | 7/2011 | Van Os |
| 2011/0173235 A1 | 7/2011 | Aman et al. |
| 2011/0176043 A1 | 7/2011 | Baker et al. |
| 2011/0199488 A1 | 8/2011 | Gorilovskij et al. |
| 2011/0199535 A1 | 8/2011 | Isu et al. |
| 2011/0211563 A1 | 9/2011 | Herrala et al. |
| 2011/0231428 A1 | 9/2011 | Kuramura |
| 2011/0235998 A1 | 9/2011 | Pond et al. |
| 2011/0254950 A1 | 10/2011 | Bibby et al. |
| 2011/0254972 A1 | 10/2011 | Yaguchi |
| 2011/0255741 A1 | 10/2011 | Jung et al. |
| 2011/0255775 A1 | 10/2011 | McNamer et al. |
| 2011/0276710 A1 | 11/2011 | Mighani et al. |
| 2011/0276881 A1 | 11/2011 | Keng et al. |
| 2011/0291925 A1 | 12/2011 | Israel |
| 2011/0300933 A1 | 12/2011 | Chien et al. |
| 2011/0312350 A1 | 12/2011 | Agerholm |
| 2012/0005628 A1 | 1/2012 | Isozu et al. |
| 2012/0011567 A1 | 1/2012 | Cronk et al. |
| 2012/0019728 A1 | 1/2012 | Moore |
| 2012/0045090 A1 | 2/2012 | Bobbitt et al. |
| 2012/0052972 A1 | 3/2012 | Bentley et al. |
| 2012/0098918 A1 | 4/2012 | Murphy |
| 2012/0120238 A1 | 5/2012 | Adar et al. |
| 2012/0121187 A1 | 5/2012 | Lee et al. |
| 2012/0173577 A1 | 7/2012 | Millar et al. |
| 2012/0176496 A1 | 7/2012 | Carbonell et al. |
| 2012/0195363 A1 | 8/2012 | Laganiere et al. |
| 2012/0198319 A1 | 8/2012 | Agnoli et al. |
| 2012/0216296 A1 | 8/2012 | Kidron |
| 2012/0257000 A1 | 10/2012 | Singhal |
| 2013/0016122 A1 | 1/2013 | Bhatt |
| 2013/0027581 A1 | 1/2013 | Price et al. |
| 2013/0076908 A1 | 3/2013 | Bratton et al. |
| 2013/0083198 A1 | 4/2013 | Maslan |
| 2013/0086665 A1 | 4/2013 | Filippi et al. |
| 2013/0089301 A1 | 4/2013 | Ju |
| 2013/0125039 A1 | 5/2013 | Murata |
| 2013/0128022 A1 | 5/2013 | Bose |
| 2013/0145270 A1 | 6/2013 | Piran et al. |
| 2013/0163430 A1 | 6/2013 | Gell et al. |
| 2013/0173819 A1* | 7/2013 | Lee ................... H04N 21/2662 |
| | | 709/231 |
| 2013/0176430 A1 | 7/2013 | Zhu et al. |
| 2013/0182905 A1 | 7/2013 | Myers et al. |
| 2013/0201329 A1 | 8/2013 | Thornton et al. |
| 2013/0202210 A1 | 8/2013 | Ryoo et al. |
| 2013/0242093 A1 | 9/2013 | Cobb et al. |
| 2013/0243322 A1 | 9/2013 | Noh et al. |
| 2013/0266292 A1 | 10/2013 | Sandrew et al. |
| 2013/0268357 A1 | 10/2013 | Heath |
| 2013/0276140 A1 | 10/2013 | Coffing et al. |
| 2013/0279810 A1 | 10/2013 | Li et al. |
| 2013/0279884 A1 | 10/2013 | Gifford |
| 2013/0340050 A1 | 12/2013 | Harrison |
| 2013/0342689 A1 | 12/2013 | Sanjay et al. |
| 2014/0007222 A1 | 1/2014 | Qureshi et al. |
| 2014/0013243 A1 | 1/2014 | Flynn, III |
| 2014/0043534 A1 | 2/2014 | Nakaoka |
| 2014/0044404 A1 | 2/2014 | Grundmann et al. |
| 2014/0050406 A1 | 2/2014 | Buehler et al. |
| 2014/0053200 A1 | 2/2014 | de Paz et al. |
| 2014/0055610 A1 | 2/2014 | Ko et al. |
| 2014/0056479 A1 | 2/2014 | Bobbitt et al. |
| 2014/0063229 A1 | 3/2014 | Olsson et al. |
| 2014/0068349 A1 | 3/2014 | Scott et al. |
| 2014/0068705 A1 | 3/2014 | Chambers et al. |
| 2014/0068789 A1 | 3/2014 | Watts et al. |
| 2014/0075370 A1 | 3/2014 | Guerin et al. |
| 2014/0082497 A1 | 3/2014 | Chalouhi et al. |
| 2014/0098992 A1 | 4/2014 | Yagi et al. |
| 2014/0105564 A1 | 4/2014 | Johar |
| 2014/0129942 A1 | 5/2014 | Rathod |
| 2014/0137188 A1 | 5/2014 | Bartholoma |
| 2014/0142907 A1 | 5/2014 | Gellaboina et al. |
| 2014/0146125 A1 | 5/2014 | Kristiansen et al. |
| 2014/0157370 A1 | 6/2014 | Plattner et al. |
| 2014/0160294 A1 | 6/2014 | Naylor |
| 2014/0173692 A1 | 6/2014 | Srinivasan et al. |
| 2014/0189808 A1 | 7/2014 | Mahaffey et al. |
| 2014/0195952 A1 | 7/2014 | Champagne et al. |
| 2014/0198237 A1 | 7/2014 | Noyes |
| 2014/0210646 A1 | 7/2014 | Subramanya |
| 2014/0219088 A1* | 8/2014 | Oyman ............... H04L 65/1083 |
| | | 370/231 |
| 2014/0229604 A1 | 8/2014 | Pfeffer |
| 2014/0245411 A1 | 8/2014 | Meng et al. |
| 2014/0245461 A1 | 8/2014 | O'Neill et al. |
| 2014/0253667 A1 | 9/2014 | Tian |
| 2014/0254863 A1 | 9/2014 | Marks et al. |
| 2014/0282877 A1 | 9/2014 | Mahaffey et al. |
| 2014/0289376 A1 | 9/2014 | Chan et al. |
| 2014/0300722 A1 | 10/2014 | Garcia |
| 2014/0313142 A1 | 10/2014 | Yairi |
| 2014/0313316 A1 | 10/2014 | Olsson et al. |
| 2014/0313542 A1 | 10/2014 | Benchorin et al. |
| 2014/0320740 A1 | 10/2014 | Wan et al. |
| 2014/0333775 A1 | 11/2014 | Naikal et al. |
| 2014/0339374 A1 | 11/2014 | Mian et al. |
| 2014/0347475 A1 | 11/2014 | Divakaran et al. |
| 2014/0376876 A1 | 12/2014 | Bentley et al. |
| 2015/0020014 A1 | 1/2015 | Suzuki et al. |
| 2015/0022432 A1 | 1/2015 | Stewart |
| 2015/0022660 A1 | 1/2015 | Kavadeles |
| 2015/0042570 A1 | 2/2015 | Lombardi et al. |
| 2015/0046184 A1 | 2/2015 | Cocco et al. |
| 2015/0052029 A1 | 2/2015 | Wu et al. |
| 2015/0054949 A1* | 2/2015 | Scalisi ................... G08B 3/10 |
| | | 348/143 |
| 2015/0054981 A1 | 2/2015 | Saiki et al. |
| 2015/0074535 A1 | 3/2015 | Silberstein et al. |
| 2015/0098613 A1 | 4/2015 | Gagvani |
| 2015/0181088 A1 | 6/2015 | Wu et al. |
| 2015/0194134 A1 | 7/2015 | Dureau et al. |
| 2015/0201152 A1 | 7/2015 | Cho et al. |
| 2015/0201198 A1* | 7/2015 | Marlatt ................ H04N 19/162 |
| | | 375/240.03 |
| 2015/0215359 A1* | 7/2015 | Bao ........................ H04L 65/60 |
| | | 709/219 |
| 2015/0215586 A1 | 7/2015 | Lasko |
| 2015/0234571 A1 | 8/2015 | Lee et al. |
| 2015/0235551 A1 | 8/2015 | Maneskiold et al. |
| 2015/0242687 A1 | 8/2015 | Seo |
| 2015/0242994 A1 | 8/2015 | Shen |
| 2015/0279182 A1 | 10/2015 | Kanaujia et al. |
| 2015/0339702 A1 | 11/2015 | Lin et al. |
| 2015/0341599 A1 | 11/2015 | Carey |
| 2016/0006932 A1 | 1/2016 | Zhang et al. |
| 2016/0006988 A1 | 1/2016 | Zhao |
| 2016/0026862 A1 | 1/2016 | Anderson |

(56) References Cited

U.S. PATENT DOCUMENTS

| | | | |
|---|---|---|---|
| 2016/0041724 | A1 | 2/2016 | Kirkby et al. |
| 2016/0042621 | A1 | 2/2016 | Hogg |
| 2016/0072831 | A1 | 3/2016 | Rieke |
| 2016/0092737 | A1 | 3/2016 | Laska et al. |
| 2016/0092738 | A1 | 3/2016 | Laska et al. |
| 2016/0103559 | A1 | 4/2016 | Maheshwari et al. |
| 2016/0103887 | A1 | 4/2016 | Fletcher et al. |
| 2016/0110612 | A1 | 4/2016 | Sabripour |
| 2016/0117951 | A1 | 4/2016 | Fleisher et al. |
| 2016/0189531 | A1 | 6/2016 | Modi |
| 2016/0195716 | A1 | 7/2016 | Nakanuma |
| 2016/0219248 | A1 | 7/2016 | Reznik et al. |
| 2016/0235344 | A1 | 8/2016 | Auerbach |
| 2016/0241818 | A1 | 8/2016 | Palanisamy et al. |
| 2016/0274771 | A1 | 9/2016 | Seong et al. |
| 2016/0285724 | A1 | 9/2016 | Lundquist et al. |
| 2016/0307418 | A1 | 10/2016 | Pantus |
| 2016/0316176 | A1 | 10/2016 | Laska et al. |
| 2016/0316256 | A1 | 10/2016 | Laska et al. |
| 2016/0321889 | A1 | 11/2016 | Gagvani |
| 2016/0360116 | A1 | 12/2016 | Penha et al. |
| 2016/0364966 | A1 | 12/2016 | Dixon et al. |
| 2016/0366036 | A1 | 12/2016 | Gupta et al. |
| 2017/0019605 | A1 | 1/2017 | Ahiska |
| 2017/0039729 | A1 | 2/2017 | Wang et al. |
| 2017/0085915 | A1* | 3/2017 | Kuusela ............... H04N 19/513 |
| 2017/0111494 | A1 | 4/2017 | Kidron et al. |
| 2017/0123492 | A1 | 5/2017 | Marggraff et al. |
| 2017/0124821 | A1 | 5/2017 | Zhang et al. |
| 2017/0162230 | A1 | 6/2017 | Maliuk et al. |
| 2017/0163929 | A1 | 6/2017 | Maliuk et al. |
| 2017/0180678 | A1 | 6/2017 | Fish et al. |
| 2017/0257612 | A1 | 9/2017 | Emeott et al. |
| 2018/0004784 | A1 | 1/2018 | Tompkins |
| 2018/0089328 | A1 | 3/2018 | Bath et al. |
| 2018/0096197 | A1 | 4/2018 | Kephart |
| 2018/0121035 | A1 | 5/2018 | Filippi et al. |
| 2018/0139254 | A1* | 5/2018 | Oyman .......... H04N 21/234336 |
| 2018/0144314 | A1 | 5/2018 | Miller |
| 2018/0182148 | A1 | 6/2018 | Yanagisawa |
| 2018/0218053 | A1 | 8/2018 | Koneru |
| 2018/0219897 | A1 | 8/2018 | Muddu et al. |
| 2019/0004639 | A1 | 1/2019 | Faulkner |
| 2019/0066473 | A1 | 2/2019 | Laska et al. |
| 2019/0311201 | A1 | 10/2019 | Selinger et al. |

OTHER PUBLICATIONS

Google Inc., International Search Report and Written Opinion, PCT/US2015/039425, dated Sep. 28, 2015, 12 pgs.

Castellanos, Event Detection in Video Using Motion Analysis, 1st ACM Int'l Workshop on Analysis & Retrieval of Tracked Events & Motion in Imagery Streams, Oct. 2010, pp. 57-62.

D. D Buzan, S. Sclaroff, & G. Kollios, "Extraction and clustering of motion trajectories in video", 2 Proceedings of the 17th Intl Conf. on Pattern Recognition 521-524 (Aug. 2004).

Delbruck, Frame-free dynamic digital vision, 2008 Intl Symp. On Secure-Life Electronics, Advanced Electronics for Quality Life & Socy, Mar. 2008, pp. 21-26.

Ellis, Model-based vision for automatic alarm interpretation, IEEE 1990 Int'l Carnahan Conf. on Security Tech, Oct. 1990, pp. 62-67.

Gresham, Review: iZon wi-fi Video monitor and its companion iOS app, 2012, p. 1-8, www.idownloadblog.com/2012/11/21/stem-izon-review.

Halliquist, How do I set up Activity Alerts, 2013, p. 1-3, http://support.dropcam.com/entries/27880086-How-do-i-set-up-Activity-Alerts.

ISPY, Motion Detection Setting up Motion Detection, Dec. 11, 2011, pp. 1-3, https://www.ispyconnect.com/userguide-motion-detection.aspx.

IZON App Guide, 2014, p. 1-30, www.isoncam.com/wp-content/uploads/2014/06/IZON-App-Guide.pdf.

James Drinkwater, "HOWTO: Set up motion detection in a Mobotix network camera", http://www.networkwebcams.com/ip-camera-learning-center/2010/03/03/howto-setting-up-motion-detection-in-a-mobotix-camera/, Mar. 3, 2010.

L. L Zelnik-Manor, "Event-based analysis of video", 2 Proceedings of the 2001 IEEE Computer Soc'y Conf. on Computer Vision & Pattern Recognition 123-130 (2001).

Logitech, Logitech Alert Video Security System: Getting to Know, 2010, p. 1-9, www.logitech.com/assets/32688/good-to-know.pdf.

Medioni, Event detection and analysis from video streams, 23 IEEE Transactions on Pattern Analysis & Machine Intelligence, Aug. 2001, pp. 873-889.

Revis, How to Setup Motion Detection of your D-Link Camera, Apr. 9, 2014, pp. 1-8, http://blog.dlink.com/how-to-set-up-motion-detection-on-your-d-link-camera.

Schraml, A spatio-termporal clustering method using real-time motion analysis on event-based 3D vision, 2010 IEEE Comp. Socy Conf. on Comp. Vision & Pattern Recognition Workshops, Jun. 2010, pp. 57-63.

Shim, A Study of Surveillance System of Objects Abnormal Behaviour by Blob Composition Analysis, 8 Int'l J. of Security & Its Applications, Mar. 2014, pp. 333-340.

Yoon, Event Detection from MPEG Video in the Compressed Domain, 15th Int'l Conf. on Pattern Recognition, Sep. 2000, pp. 819-822.

Li, W. Whuang, I.Y.H. Gu, & Q. Tian, "Statistical Modeling of Complex Backgrounds for Foreground Object Detection", 13 IEEE Transactions on Image Processing 1459-1472 (Nov. 2004).

M. Camplani, T. Mantecon, & L. Salgado, "Accurate Depth-Color Scene Modeling for 3D Contents Generation with Low Cost Depth Cameras", 19 IEEE Int'l Conf. on Image Processing 1741-1744 (Oct. 2012).

F. Zhou, F. De la Torre, & J.K. Hodgins, "Aligned Cluster Analysis for Temporal Segmentation of Human Motion", 8 IEEE Int'l Conf. on Automatic Face & Gesture Recognition 1-7 (Sep. 2008).

Yuri Ivanov and Christopher Wren, "Toward Spatial Queries for Spatial Surveillance Tasks", May 2006, https://www.researchgate.netlprofile/Yuri 1van0v2/publication/21 5439735 Toward Spatial Queries for Spatial Surveillance Tasks/links/0c960539e6408cb328000000.pdf, p. 1-9.

Author unknown, "Ch. 1 Configuring Main System" (GEOVision), 2009, https://www.web.archive.org/web/20090520185506/https:/videos/cctvcamerapros.com/pdf/geovision/geovision-8-manual-chl.pdf, p. 1-79.

Central Intelligence Agency "Words of Estimative Probability" May 25, 2018, 12 pgs.

Literature Review—Graphical Tools, [online], publication date unknown, retrieved on Dec. 20, 2018. Retrieved from <URL: https:// www.stat.auckland.ac.nz/-joh024/LitReviews/LitReview GraphicalTools.pdf>, all pages.

Clustered/Stacked Filled Bar Graph Generator, [online], website crawled on Mar. 26, 2014, retrieved on Dec. 31, 2018. Retrieved from, < URL: https://web.archive.org/web/20140326054333/http://www.burningcutlery.conn:80/derek/bargraph/>, all pages.

N. Hueber, C. Hennequin, P. Raymond, & J.P. Moeglin, "Real-time movement detection and analysis for video surveillance applications", 9079 Proc. SPIE 0b-1-0B7 (Jun. 10, 2014) (Year: 2014).

"Advisory Action", U.S. Appl. No. 15/167,957, dated Feb. 8, 2019, 6 pages.

"Final Office Action", U.S. Appl. No. 15/167,957, dated Oct. 22, 2018, 20 pages.

"Non-Final Office Action", U.S. Appl. No. 15/167,957, dated Mar. 26, 2018, 16 pages.

"Notice of Allowance", U.S. Appl. No. 15/167,957, dated Jul. 30, 2019, 8 pages.

"Pre-Interview First Office Action", U.S. Appl. No. 15/167,957, dated Feb. 5, 2018, 4 pages.

"FI8921W email notification and motion alarm", http://foscam.us/forum/fi8921w-email-notification-and-motion-alarm-t5874.html, Jun. 4, 2013, 2 pages.

"File:savedemo.png", https://wiki.freepascal.org/File:savedemo.png, Apr. 3, 2014, 2 pages.

(56) References Cited

OTHER PUBLICATIONS

"Graph Maker", https://forum.unity.com/threads/released-graph-maker-ugui-ngui-dfgui-line-graphs-bar-gaphs-pie-graphs-etc. 202437, 21 pages.

"Histograms", Retrieved at: https://root.cem.ch/root/htmldoc/guides/users-guide/Histograms.html—on Dec. 20, 2018, 55 pages.

"You Tube, Sky News Live", (screenshot of website illustrating live stream video with timeline having preview thumbnail of past images within the stream) retrieved at: https://www.youtube.com/watch?v=9Auq9mYxFEE, 2 pages.

Villier, "Amplification of the Antibody Response by C3b Complexed to Antigen Through an Ester Link", https://www.iimmunol.org/content/162/6/3647, Mar. 15, 1999, 7 pages.

\* cited by examiner

Video Server System 508

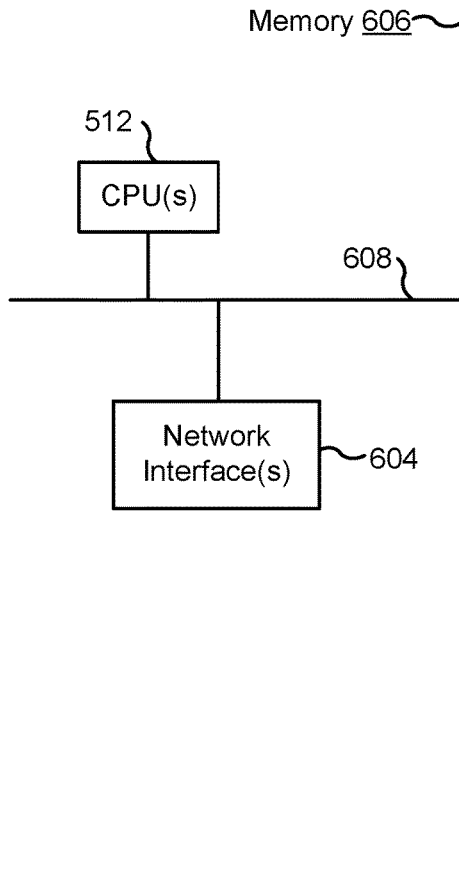

| Operating System 610 |
| --- |
| Network Communication Module 612 |
| Server-Side Module 506 |
| Account Administration Module 614 |
| Video Data Receiving Module 616 |
| Camera Control Module 618 |
| Event Detection Module 620 |
| Event Categorization Module 622 |
| Zone Creation Module 624 |
| Person Identification Module 626 |
| Filter Application Module 628 |
| Zone Monitoring Module 630 |
| Real-time Motion Event Presentation Module 632 |
| Event Post-processing Module 634 |
| ⋮ |
| Server Data 636 |
| Video Storage Database 514 |
| Account Database 516 |
| Network Data 636 |
| ⋮ |

Figure 6

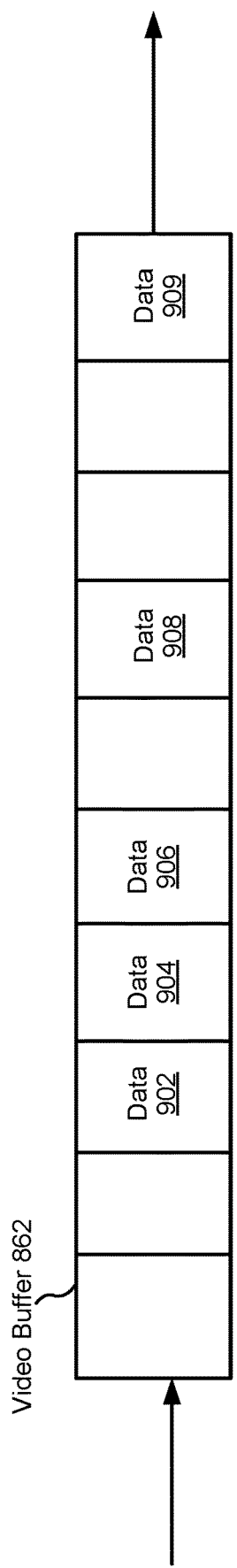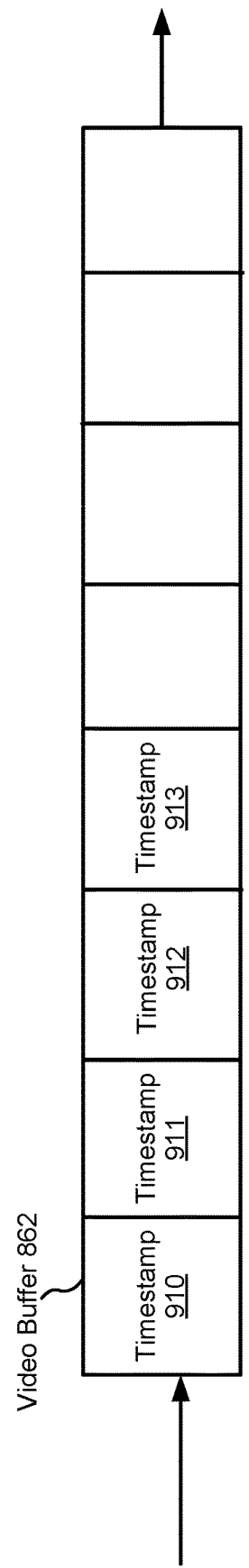
Figure 9C
Figure 9D

METHODS AND DEVICES FOR DYNAMIC ADAPTATION OF ENCODING BITRATE FOR VIDEO STREAMING

RELATED APPLICATIONS

This application is a continuation of U.S. patent application Ser. No. 15/167,957, filed May 27, 2016, entitled "Methods and Devices for Dynamic Adaptation of Encoding Bitrate for Video Streaming," which is hereby incorporated by reference in its entirety.

This application is related to U.S. patent application Ser. No. 14/510,042, filed Oct. 8, 2014, entitled "Method and System for Categorizing Detected Motion Events," which is hereby incorporated by reference in its entirety.

This application is related to U.S. Design patent application Ser. No. 29/504,605, filed Oct. 7, 2014, entitled "Video Monitoring User Interface with Event Timeline and Display of Multiple Preview Windows At User-Selected Event Marks," which is hereby incorporated by reference in its entirety.

TECHNICAL FIELD

The disclosed implementations relates generally to video processing, including, but not limited, to dynamically adapting encoding bitrate for a video stream.

BACKGROUND

Video surveillance produces a large amount of continuous video data over the course of hours, days, and even months. Transmitting these large amounts of data for analysis and/or review can be challenging if the network conditions are poor or inconsistent. If the encoded bitrate exceeds the capabilities of the network data may be lost or the camera may cease to operate properly. However, if the encoded bitrate is low, even when network conditions are good, events occurring within the video may be more difficult to detect and/or analyze.

It is a challenge to select optimal bitrates in view of changing network conditions and the need to effectively detect and analyze captured events.

SUMMARY

Current camera devices are agnostic to available bandwidth (e.g., available WiFi bandwidth) and always stream at some predefined video encoding bitrate/frame rate level. Under poor connectivity, where upload rate cannot match the encoding rate, the camera accumulates media data in a local buffer (e.g., a video buffer). This leads to high end-to-end latency, and eventually the camera may reboot due to buffer overflow or by server command. Thus it is desirable to have the camera adaptively change encoding bitrate based on the available bandwidth. This enhances the live-viewing user experience and better preserves video history (no data lost due to camera reboots) under poor connectivity conditions.

Accordingly, there is a need for dynamic adaptation of encoding bitrate for video streaming. Such methods optionally complement or replace conventional methods for encoding bitrates for video streaming. The various implementations described herein include systems, methods, and/or devices used to dynamically adapt encoding bitrates.

(A1) In one aspect, some implementations include a method performed at a camera device having an image sensor, one or more processors, and memory storing one or more programs for execution by the one or more processors. The method includes: (i) capturing a stream of images using the image sensor; and (ii) while capturing the stream of images: (a) encoding a first portion of the stream of images with a first bitrate; (b) transmitting the encoded first portion of the stream of images to a server system; (c) obtaining one or more transmission metrics for the transmitted first portion of the stream of images; (d) based on the one or more transmission metrics, encoding a second portion of the stream of images with a second bitrate, distinct from the first bitrate; and (e) transmitting the encoded second portion of the stream of images to the server system.

(A2) In some implementations of the method of A1, the one or more transmission metrics include at least one of: (i) a transmission rate for the encoded first portion of the stream of images; and (ii) a buffer latency for the encoded first portion of the stream of images.

(A3) In some implementations of the method of any one of A1-A2, the method further includes obtaining at least one of the one or more transmission metrics from the server system.

(A4) In some implementations of the method of any one of A1-A3: (i) the camera device includes a video buffer; (ii) the method further includes, prior to transmitting the first portion of the stream of images, holding the encoded first portion of the stream of images in the video buffer; and (iii) transmitting the encoded first portion of the stream of images to the server system includes transmitting the encoded first portion of the stream of images from the video buffer to the server system.

(A5) In some implementations of the method of any one of A1-A4, the method further includes: (i) determining an input rate and an output rate for the video buffer; and (ii) calculating a transmission rate for the first portion of the stream of images based on the determined input rate and the determined output rate; where the one or more transmission metrics includes the calculated transmission rate (A6) In some implementations of the method of any one of A1-A5: (i) each image in the encoded first portion of the stream of images has an associated timestamp; and (ii) the method further includes calculating a transmission latency for the first portion of the stream of images based on timestamps for images in the video buffer; where the one or more transmission metrics includes the calculated transmission latency.

(A7) In some implementations of the method of any one of A1-A6: (i) the one or more transmission metrics indicate that the first bitrate exceeds transmission bandwidth available to the camera device for transmitting to the server system; and (ii) the second bitrate is lower than the first bitrate.

(A8) In some implementations of the method of any one of A1-A6: (i) the one or more transmission metrics indicate that the first bitrate does not exceed transmission bandwidth available to the camera device for transmitting to the server system; and (ii) the second bitrate is higher than the first bitrate.

(A9) In some implementations of the method of any one of A1-A8, encoding the second portion of the stream of images with the second bitrate, distinct from the first bitrate comprises adjusting one or more of: (i) a frame rate of the stream of images; and (ii) an image resolution of the stream of images.

(A10) In some implementations of the method of any one of A1-A9, the method further includes selecting the second bitrate based on the one or more transmission metrics and one or more additional factors.

(A11) In some implementations of the method of any one of A1-A10: (i) capturing the stream of images using the image sensor comprises capturing the stream of images at a first resolution; and (ii) the method further includes: (a) obtaining one or more second transmission metrics for the transmitted second portion of the stream of images; (b) based on the one or more second transmission metrics, forgoing capturing the stream of images at the first resolution; and (c) capturing the stream of images at a second resolution.

In another aspect, some implementations include a camera device having an image sensor; and one or more controllers coupled to the image sensor. In some implementations, the one or more controllers are configured to perform any of the methods described herein (e.g., A1-A11 described above).

In yet another aspect, some implementations include a non-transitory computer-readable storage medium storing one or more programs, the one or more programs comprising instructions, which, when executed by a camera device with one or more controllers, cause the camera device to perform any of the methods described herein (e.g., A1-A11 described above).

In yet another aspect, some implementations include a computing system with the means to perform any of the methods described herein (e.g., A1-A11 described above).

Thus, devices, storage mediums, and computing systems are provided with methods dynamically adapting encoding bitrates for video streaming, thereby increasing the effectiveness, efficiency, and user satisfaction with such systems. Such methods may complement or replace conventional methods for encoding bitrates for video streaming.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 6 is a block diagram illustrating an example video server system in accordance with some implementations.

FIGS. 9C-9D illustrate example video buffers in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

This disclosure provides example devices, user interfaces, data processing systems, and methods for encoding bitrates.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Figure 1:
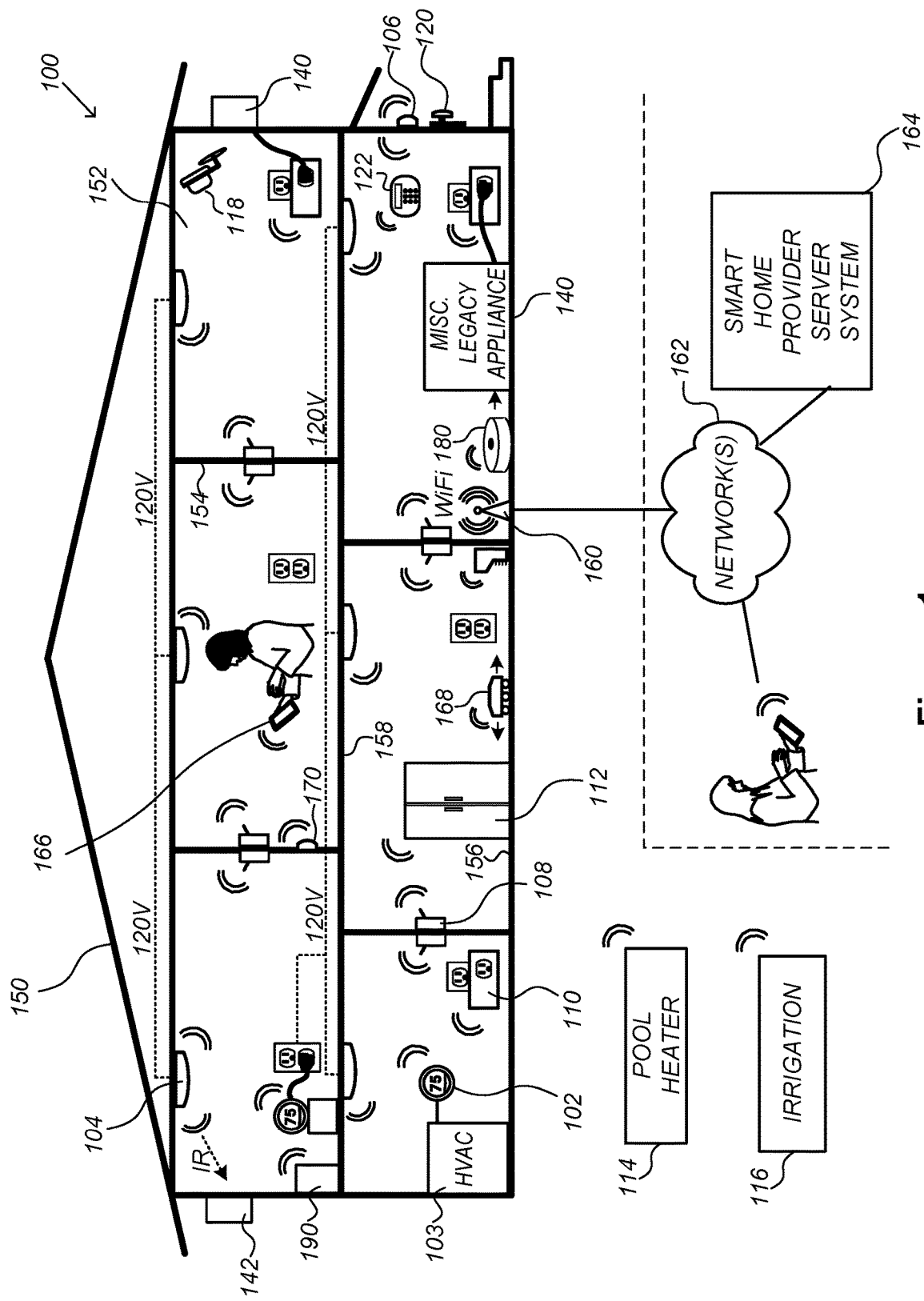
FIG. 1 is an example smart home environment in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 10"), one or more intelligent, network-connected, multi-sensing hazard detection units 104 (hereinafter referred to as "smart hazard detectors 104"), one or more intelligent, multi-sensing, network-connected entryway interface devices 106 and 120 hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding black-body radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120, announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, local storage device 190 is communicatively coupled to one or more smart devices via a smart home network (e.g., smart home network 202, FIG. 2). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of camera 118 exceeds the available bandwidth of the external network (e.g., network(s) 162). In some implementations, local storage device 190 temporarily stores video data from one or more cameras (e.g., camera 118) prior to transferring the video data to a server system (e.g., server system 508, FIG. 5).

Figure 2:
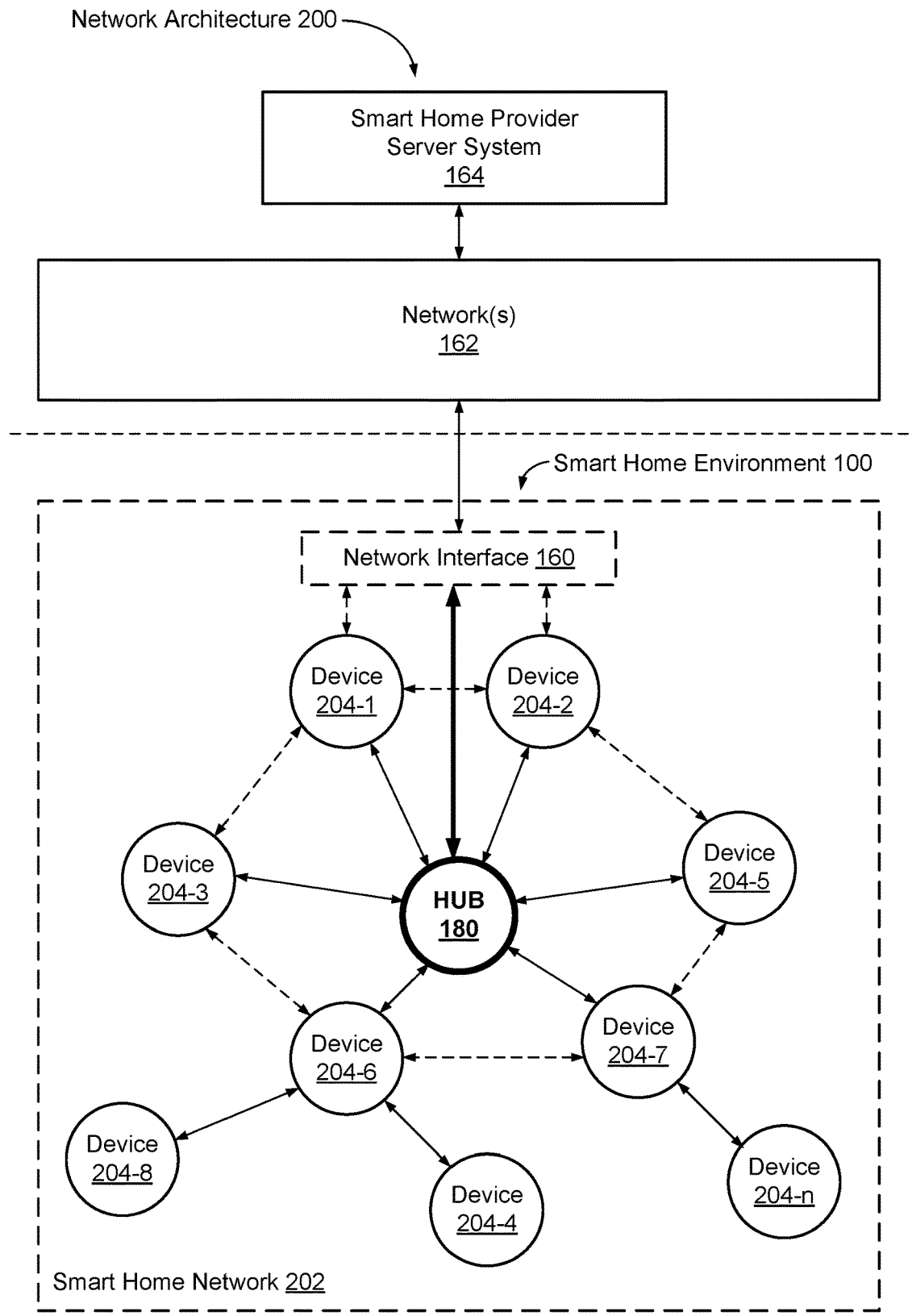
FIG. 2 is a block diagram illustrating an example network architecture that includes a smart home network in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
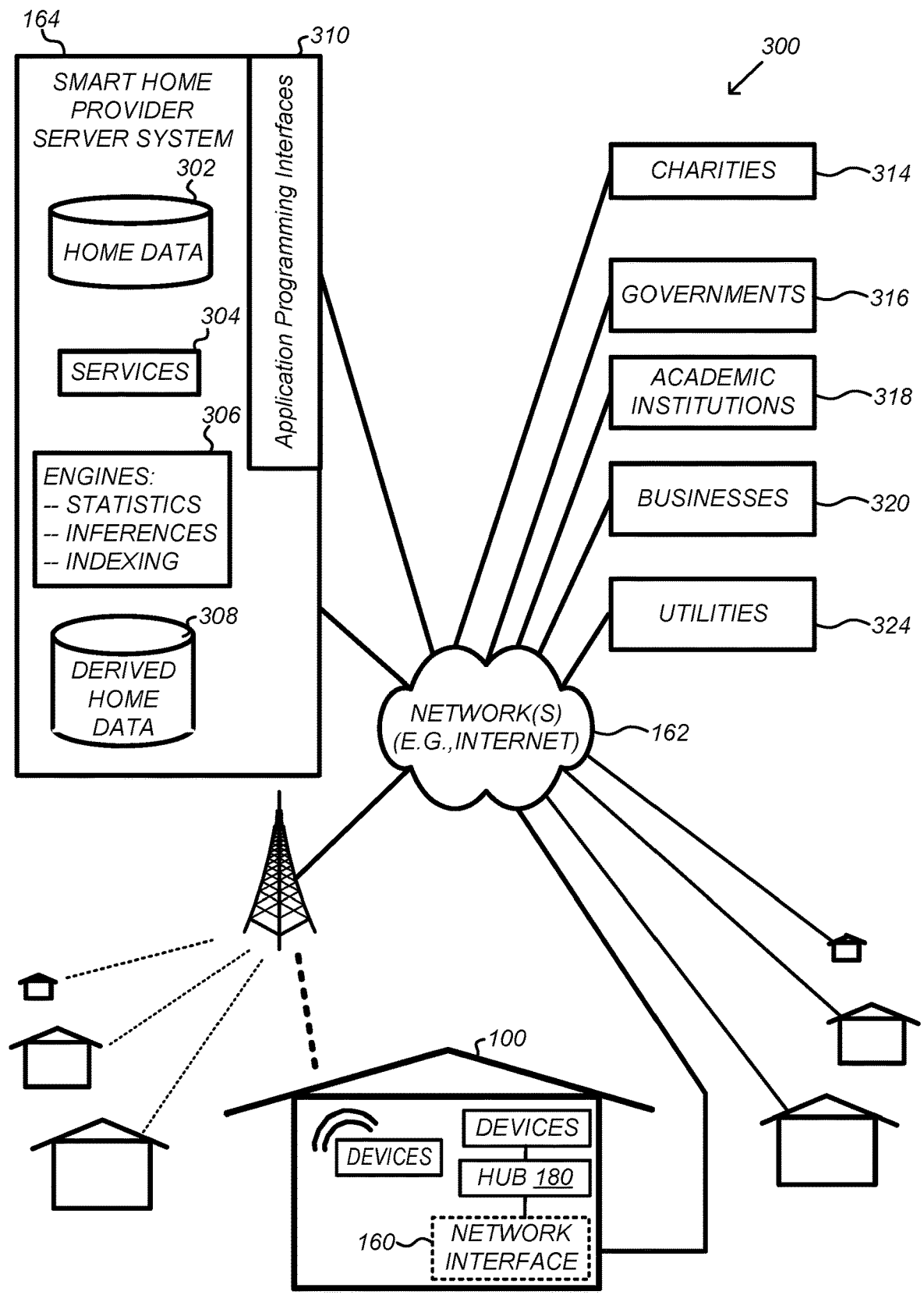
FIG. 3 illustrates an example network-level view of an extensible devices and services platform with which the smart home environment of FIG. 1 is integrated, in accordance with some implementations.

FIG. 3 illustrates an example network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
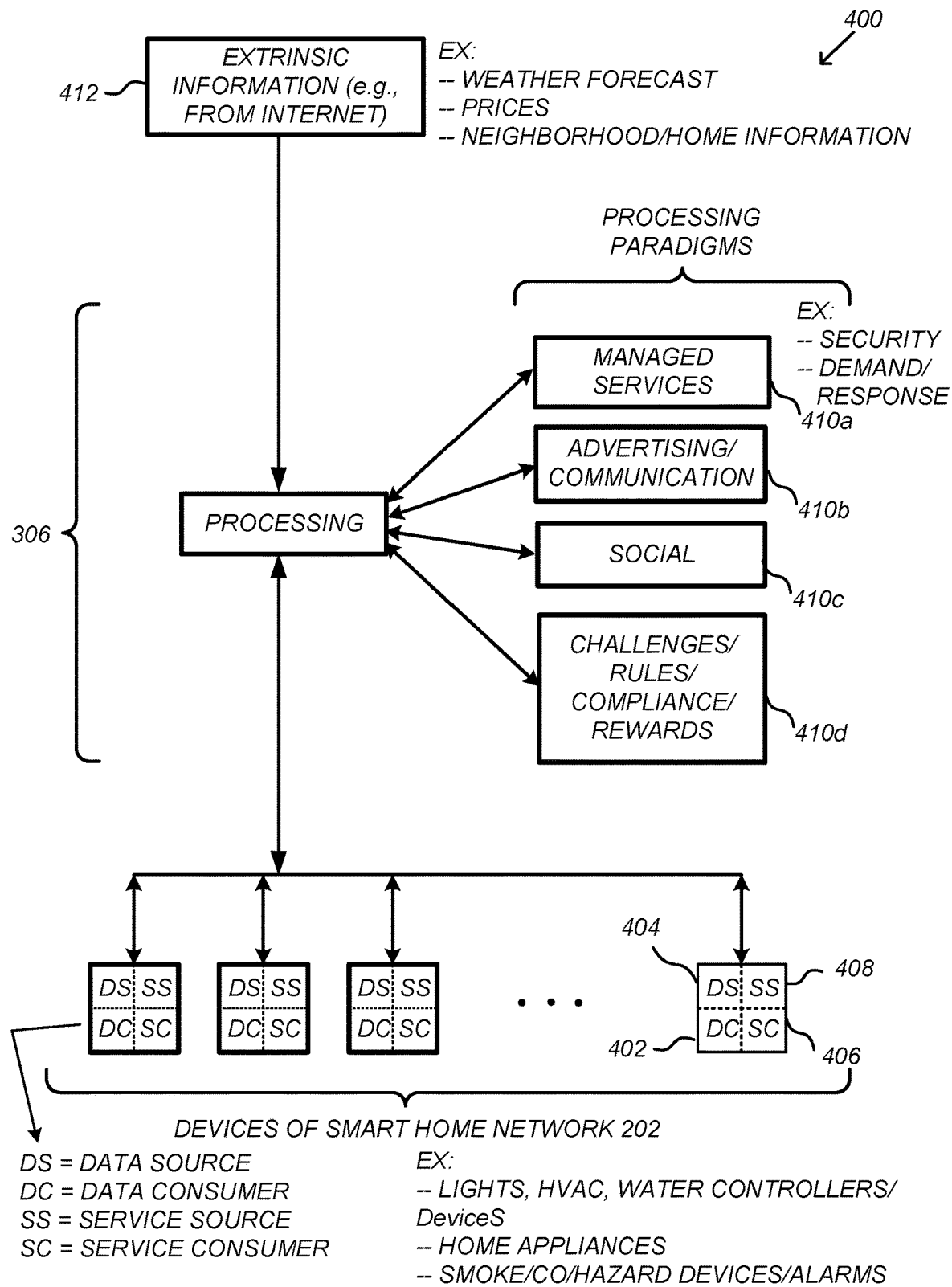
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
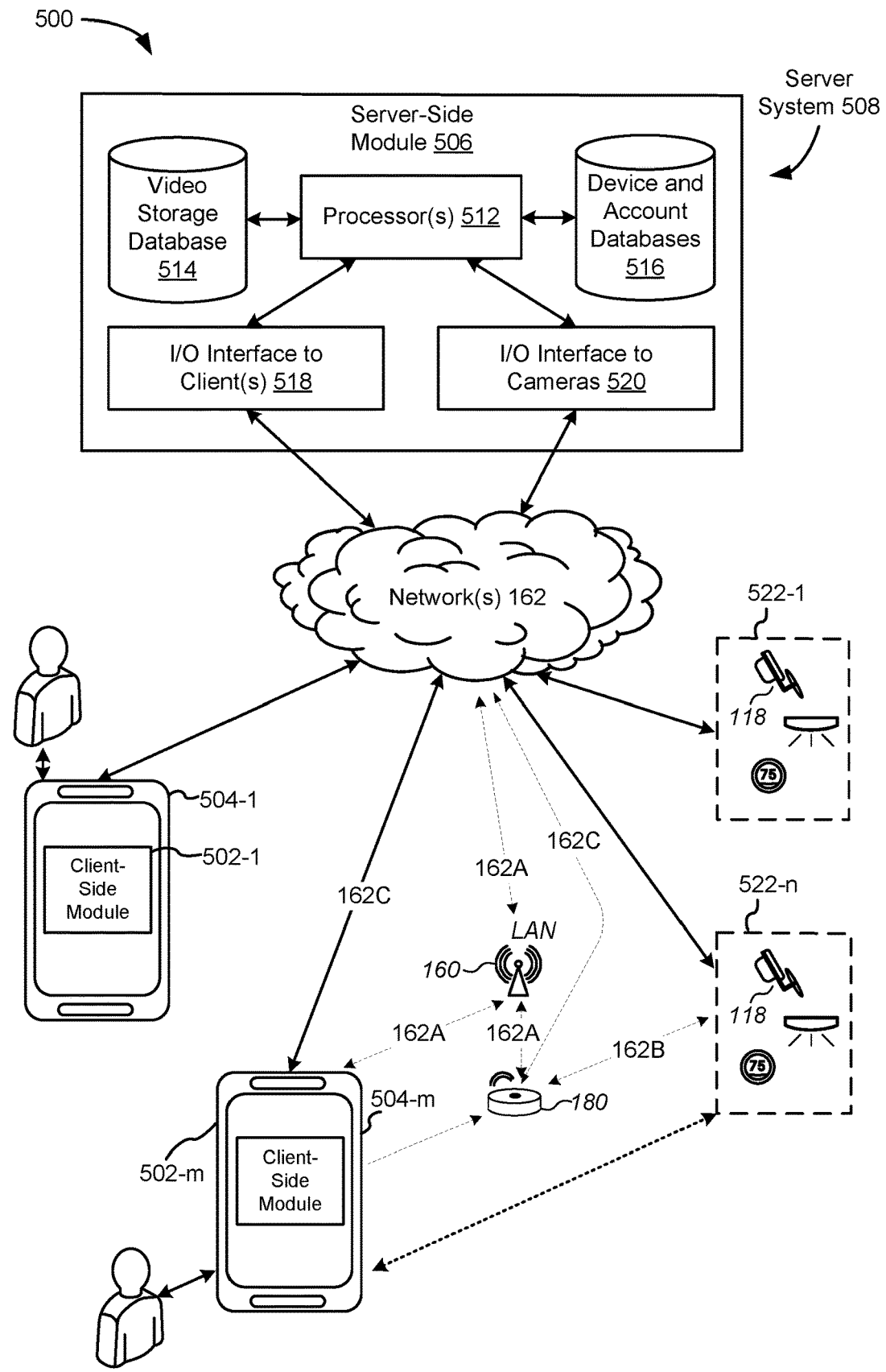
FIG. 5 is an example operating environment in which a video server system interacts with client devices and video sources in accordance with some implementations.

FIG. 5 illustrates a representative operating environment 500 in which a server system 508 provides data processing for monitoring and facilitating review of motion events in video streams captured by video cameras 118. As shown in FIG. 5, the server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the server system 508. In some implementations, the server system 508 is a dedicated video processing server that provides video processing services to video sources and client devices 504 independent of other services provided by the server system 508.

In some implementations, each of the video sources 522 includes one or more video cameras 118 that capture video and send the captured video to the server system 508 substantially in real-time. In some implementations, each of the video sources 522 optionally includes a controller device (not shown) that serves as an intermediary between the one or more cameras 118 and the server system 508. The controller device receives the video data from the one or more cameras 118, optionally, performs some preliminary processing on the video data, and sends the video data to the server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 508.

As shown in FIG. 5, in accordance with some implementations, each of the client devices 504 includes a client-side module 502. The client-side module 502 communicates with a server-side module 506 executed on the server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processor 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 508 is implemented on one or more standalone data processing apparatuses or a distributed network of computers. In some implementations, the server system 508 also employs various virtual devices and/or services of third party service providers (e.g., third-party cloud service providers) to provide the underlying computing resources and/or infrastructure resources of the server system 508. In some implementations, the server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the server system 508 can vary in different implementations. For example, in some implementations, client-side module 502 is a thin-client that provides only user-facing input and output processing functions, and delegates all other data processing functionalities to a backend server (e.g., the server system 508). Similarly, in some implementations, a respective one of the video sources 522 is a simple video capturing device that continuously captures and streams video data to the server system 508 without no or limited local preliminary processing on the video data. Although many aspects of the present technology are described from the perspective of the server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the server system 508, the client device 504, and the video sources 522 cooperatively.

It should be understood that operating environment 500 that involves the server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-*m*) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-*n* exchange data with the hub device 180. Alternatively, in some situations, some of the electronic devices of the video sources 522-*n* communicate with the network interface device 160 directly via the same sub-network 162A that couples devices 160, 180 and 504-*m*. In some implementations (e.g., in the network 162C), both the client device 504-*m* and the electronic devices of the video sources 522-*n* communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-*n*. As explained above, the network interface device 160 and the hub device 180 optionally communicate with each other via a sub-network 162A.

FIG. 6 is a block diagram illustrating the video server system 508 in accordance with some implementations. The video server system 508, typically, includes one or more processing units (CPUs) 512, one or more network interfaces 604 (e.g., including the I/O interface to one or more clients 518 and the I/O interface to one or more video sources 520), memory 606, and one or more communication buses 608 for interconnecting these components (sometimes called a chipset). The memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from the one or more processing units 512. The memory 606, or alternatively the non-volatile memory within the memory 606, includes a non-transitory computer-readable storage medium. In some implementations, the memory 606, or the non-transitory computer-readable storage medium of the memory 606, stores the following programs, modules, and data structures, or a subset or superset thereof:

Operating system 610 including procedures for handling various basic system services and for performing hardware dependent tasks;

Network communication module 612 for connecting the video server system 508 to other computing devices (e.g., the client devices 504 and the video sources 522 including camera(s) 118) (e.g., connected to the one or more networks 162 via the one or more network interfaces 604 (wired or wireless)) and/or for determining various network statistics;

Server-side module 506, which provides server-side data processing and functionalities for the event monitoring and review, including but not limited to:

Account administration module 614 for creating reviewer accounts, performing camera registration processing to establish associations between video sources to their respective reviewer accounts, and providing account login-services to the client devices 504;

Video data receiving module 616 for receiving raw video data from the video sources 522, and preparing the received video data for event processing and long-term storage in the video storage database 514;

Camera control module 618 for generating and sending server-initiated control commands to modify the operation modes of the video sources, and/or receiving and forwarding user-initiated control commands to modify the operation modes of the video sources 522;

Event detection module 620 for detecting motion event candidates in video streams from each of the video sources 522, including motion track identification, false positive suppression, and event mask generation and caching;

Event categorization module 622 for categorizing motion events detected in received video streams;

Zone creation module 624 for generating zones of interest in accordance with user input;

Person identification module 626 for identifying characteristics associated with presence of humans in the received video streams;

Filter application module 628 for selecting event filters (e.g., event categories, zones of interest, a human filter, etc.) and applying the selected event filter to past and new motion events detected in the video streams;

Zone monitoring module 630 for monitoring motions within selected zones of interest and generating notifications for new motion events detected within the selected zones of interest, where the zone monitoring takes into account changes in surrounding context of the zones and is not confined within the selected zones of interest;

Real-time motion event presentation module 632 for dynamically changing characteristics of event indicators displayed in user interfaces as new event filters, such as new event categories or new zones of interest, are created, and for providing real-time notifications as new motion events are detected in the video streams; and Event post-processing module 634 for providing summary time-lapse for past motion events detected in video streams, and providing event and category editing functions to user for revising past event categorization results; and server data 636 storing data for use in data processing for motion event monitoring and review, including but not limited to:

Video storage database 514 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, DTPZ settings of the cameras 118, etc.) associated with the motion events;

Account database 516 for storing account information for reviewer accounts, including login-credentials, associated video sources, relevant user and hardware characteristics (e.g., service tier, camera model, storage capacity, processing capabilities, etc.), user interface settings, monitoring preferences, etc.; and Network data 636 for storing statistics, parameters, and the like for connections, or portions thereof, between the server system and various smart home environments, cameras, and/or other smart devices.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 606, optionally, stores a subset of the modules and data structures identified above. Furthermore, the memory 606, optionally, stores additional modules and data structures not described above. In some implementations, video server system 508 comprises smart home provide server system 164. In some implementations, smart home provide server system 164 includes video server system 508.

Figure 7:
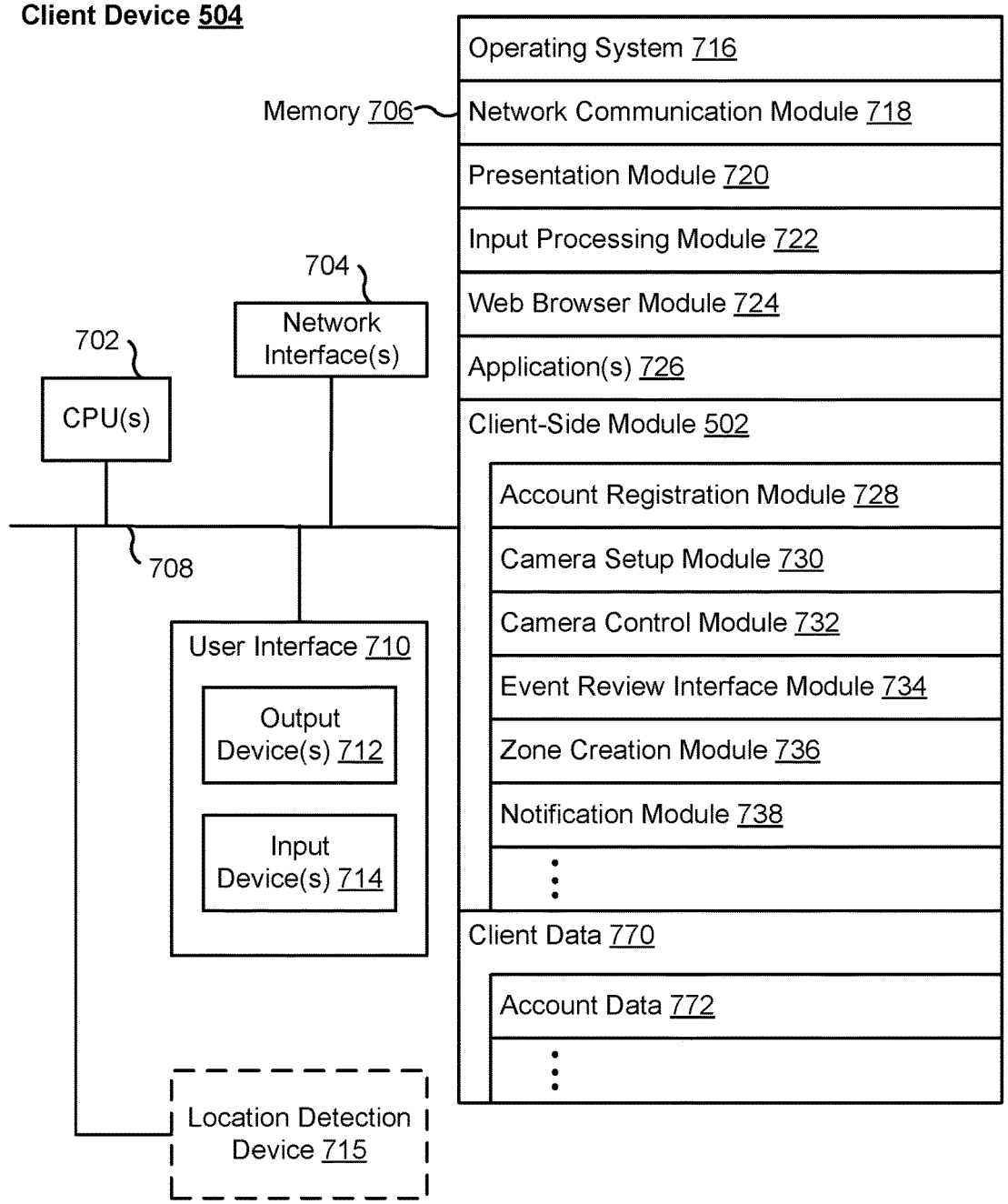
FIG. 7 is a block diagram illustrating an example client device in accordance with some implementations.

FIG. 7 is a block diagram illustrating a representative client device 504 associated with a reviewer account in accordance with some implementations. The client device 504, typically, includes one or more processing units (CPUs) 702, one or more network interfaces 704, memory 706 and one or more communication buses 708 for interconnecting these components (sometimes called a chipset). The client device 504 also includes a user interface 710. The user interface 710 includes one or more output devices 712 that enable presentation of media content, including one or more speakers and/or one or more visual displays. The user interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. In some implementations, the client device 504 includes one or more cameras, scanners, or photo sensor units for capturing images. In some implementations, the client device 504 optionally includes a location detection device 715, such as a GPS (global positioning satellite) or other geo-location receiver, for determining the location of the client device 504.

The memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 706, optionally, includes one or more storage devices remotely located from the one or more processing units 702. The memory 706, or alternatively the non-volatile memory within the memory 706, includes a non-transitory computer-readable storage medium. In some implementations, the memory 706, or the non-transitory computer-readable storage medium of memory 706, stores the following programs, modules, and data structures, or a subset or superset thereof:

Operating system 716 including procedures for handling various basic system services and for performing hardware dependent tasks;

Network communication module 718 for connecting the client device 504 to other computing devices (e.g., the video server system 508 and the video sources 522) connected to the one or more networks 162 via the one or more network interfaces 704 (wired or wireless);

Presentation module 720 for enabling presentation of information (e.g., user interfaces for application(s) 726 or the client-side module 502, widgets, web sites and web pages thereof, and/or games, audio and/or video content, text, etc.) at the client device 504 via the one or more output devices 712 (e.g., displays, speakers, etc.) associated with the user interface 710;

Input processing module 722 for detecting one or more user inputs or interactions from one of the one or more input devices 714 and interpreting the detected input or interaction;

Web browser module 724 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;

One or more applications 726 for execution by the client device 504 (e.g., games, social network applications, smart home applications, and/or other web or non-web based applications);

Client-side module 502, which provides client-side data processing and functionalities for monitoring and reviewing motion events detected in the video streams of one or more video sources, including but not limited to:

Account registration module 728 for establishing a reviewer account and registering one or more video sources with the video server system 508;

Camera setup module 730 for setting up one or more video sources within a local area network, and enabling the one or more video sources to access the video server system 508 on the Internet through the local area network;

Camera control module 732 for generating control commands for modifying an operating mode of the one or more video sources in accordance with user input;

Event review interface module 734 for providing user interfaces for reviewing event timelines, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;

Zone creation module 736 for providing a user interface for creating zones of interest for each video stream in accordance with user input, and sending the definitions of the zones of interest to the video server system 508; and Notification module 738 for generating real-time notifications for all or selected motion events on the client device 504 outside of the event review user interface; and client data 770 storing data associated with the reviewer account and the video sources 522, including, but is not limited to:

Account data 772 storing information related with the reviewer account, and the video sources, such as cached login credentials, camera characteristics, user interface settings, display preferences, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, the memory 706, optionally, stores additional modules and data structures not described above.

In some implementations, at least some of the functions of the video server system 508 are performed by the client device 504, and the corresponding sub-modules of these functions may be located within the client device 504 rather than the video server system 508. In some implementations, at least some of the functions of the client device 504 are performed by the video server system 508, and the corresponding sub-modules of these functions may be located within the video server system 508 rather than the client device 504. The client device 504 and the video server system 508 shown in FIGS. 6-7, respectively, are merely illustrative, and different configurations of the modules for implementing the functions described herein are possible in various implementations.

Figure 8A:
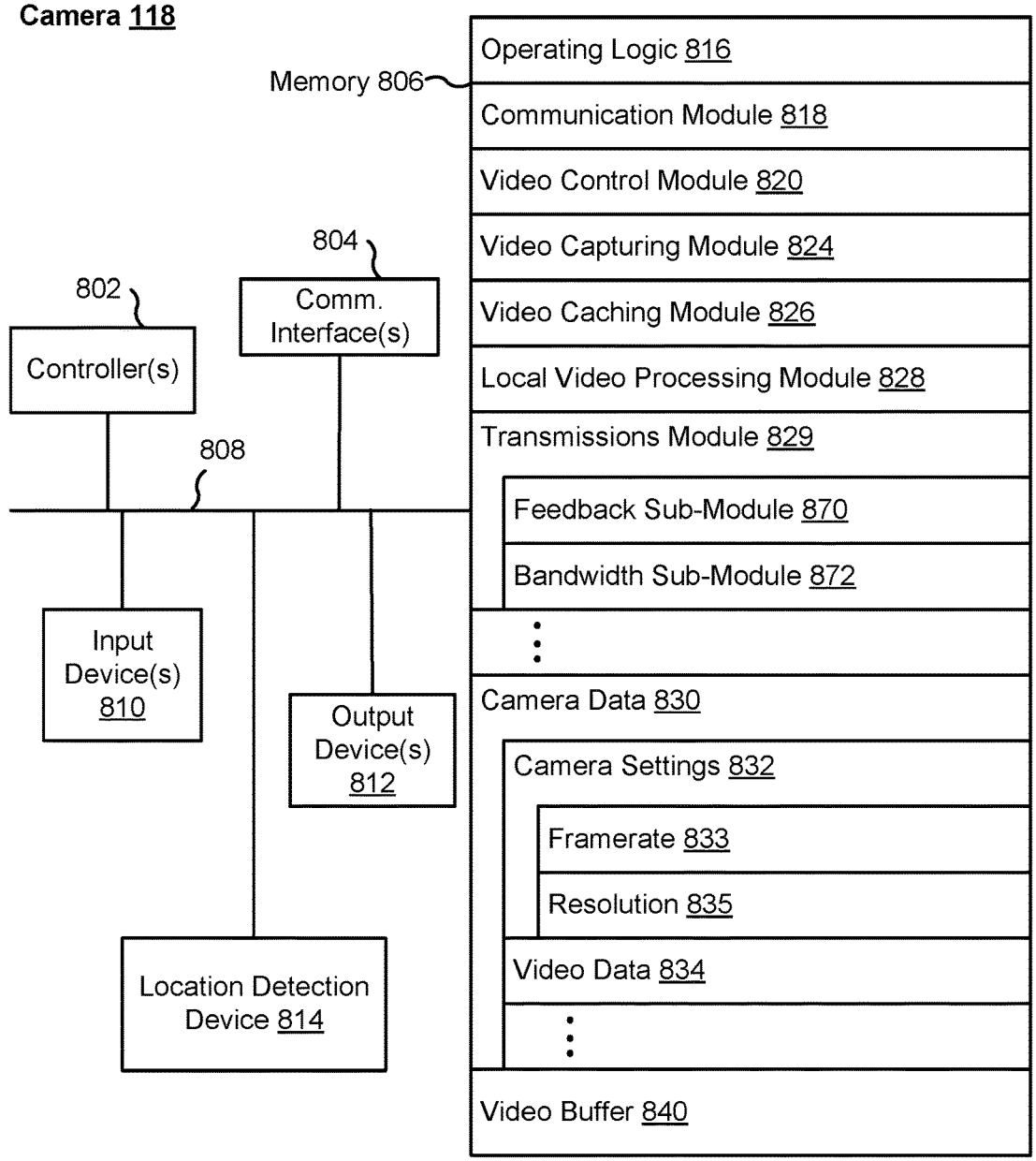
FIGS. 8A-8B are block diagrams illustrating example video capturing devices (e.g., cameras) in accordance with some implementations.

FIG. 8A is a block diagram illustrating an example camera 118 in accordance with some implementations. In some implementations, the camera 118 includes one or more controllers (e.g., CPUs, ASICs, FPGAs, microprocessors, and the like) 802, one or more communication interfaces 804, memory 806, and one or more communication buses 808 for interconnecting these components (sometimes called a chipset). In some implementations, the camera 118 includes one or more input devices 810 such as one or more buttons for receiving input and one or more microphones. In some implementations, the camera 118 includes one or more output devices 812 such as one or more indicator lights, a sound card, a speaker, a small display for displaying textual information and error codes, etc. In some implementations, the camera 118 includes a location detection device 814, such as a GPS (global positioning satellite) or other geo-location receiver, for determining the location of the camera 118.

The memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 806, or alternatively the non-volatile memory within the memory 806, includes a non-transitory computer-readable storage medium. In some implementations, the memory 806, or the non-transitory computer-readable storage medium of the memory 806, stores the following programs, modules, and data structures, or a subset or superset thereof:

Operating system 816 including procedures for handling various basic system services and for performing hardware dependent tasks;

Network communication module 818 for connecting the camera 118 to other computing devices (e.g., the video server system 508, the client device 504, network routing devices, one or more controller devices, and networked storage devices) connected to the one or more networks 162 via the one or more communication interfaces 804 (wired or wireless);

Video control module 820 for modifying the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and/or the like;

Video capturing module 824 for capturing, encoding, and/or generating a video stream and sending the video stream to the video server system 508 as a continuous feed or in short bursts;

Video caching module 826 for storing some or all captured video data locally at one or more local storage devices (e.g., memory, flash drives, internal hard disks, portable disks, etc.);

Local video processing module 828 for performing preliminary processing of the captured video data locally at the camera 118, including for example, encoding, compressing and/or encrypting the captured video data for network transmission, preliminary motion event detection, preliminary false positive suppression for motion event detection, preliminary motion vector generation, etc.;

Transmissions module 829 for monitoring network conditions and adjusting encoding bitrates (e.g., in conjunction with video capturing module 824), optionally including:

Feedback sub-module 870 for obtaining and analyzing various transmission statistics, parameters, network conditions, and the like; and Bandwidth sub-module 872 for determining an encoding bitrate for the video stream (e.g., in conjunction with video capturing module 824) based on various network conditions, camera settings, smart home settings, and a prioritization assigned to the camera;

Camera data 830 storing data, including but not limited to:
  Camera settings 832, including framerate settings 833, resolution settings 835, one or more network settings, camera operation settings, camera storage settings, etc.; and
  Video data 834, including video segments and motion vectors for detected motion event candidates to be sent to the video server system 508; and
  Video buffer 840 for buffering (e.g., in conjunction with video caching module 829) an encoded video stream prior to transmission (e.g., to server system 508).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 806, optionally, stores a subset of the modules and data structures identified above. Furthermore, memory 806, optionally, stores additional modules and data structures not described above.

Figure 8B:
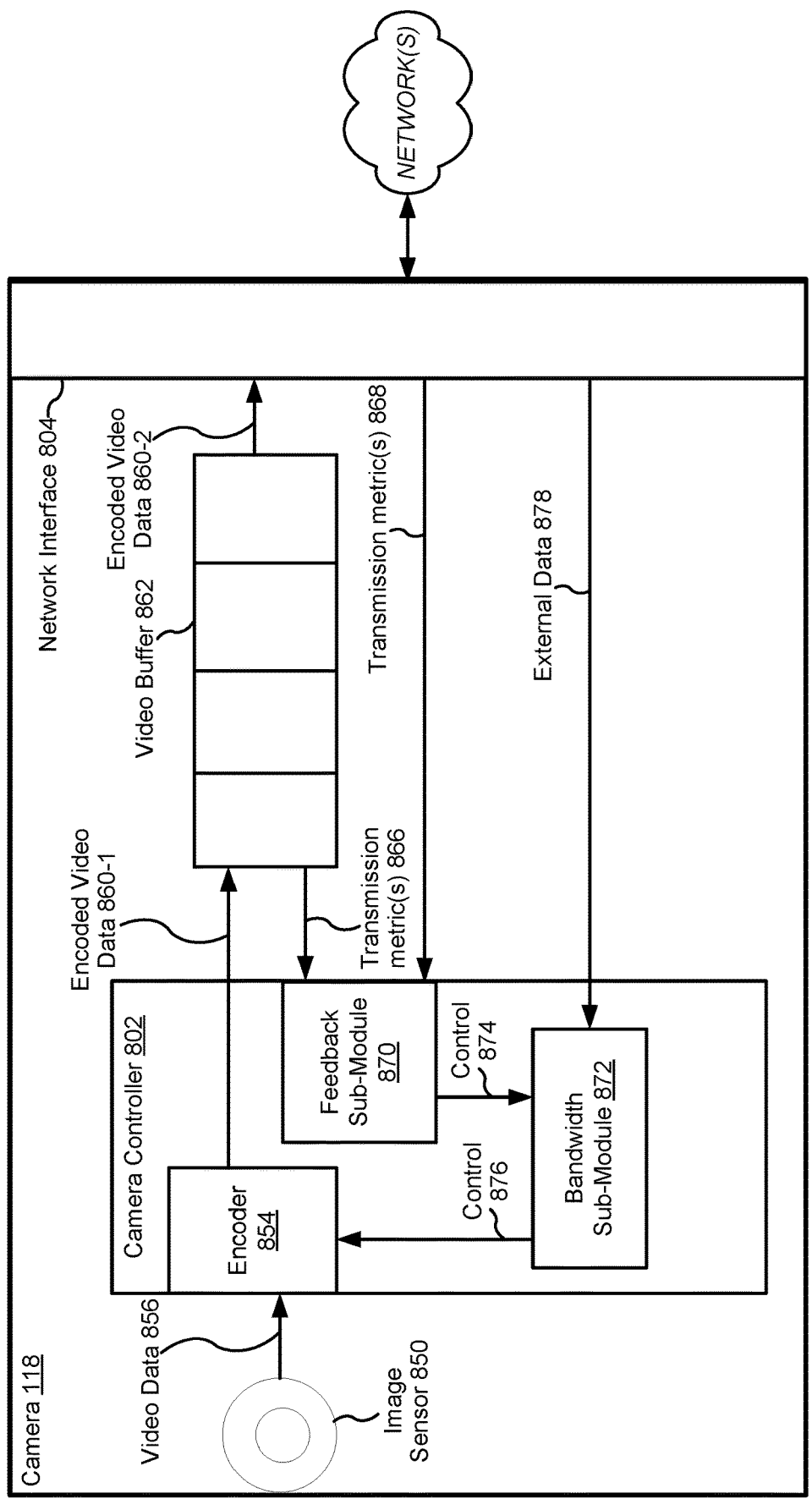

FIG. 8B is a block diagram illustrating camera device 118 in accordance with some implementations. Camera 118 includes one or more image sensor(s) 850 for capturing images and transmitting video data 856 to camera controller 802. Camera controller 802 receives video data 856 and outputs encoded video data 860. Camera controller 802 includes encoder 854 for encoding video data. In some implementations, encoder 854 comprises hardware such as device, circuit, transducer, and/or software that converts video data 856 into encoded video data 860 for the purposes of standardization, speed, or compressions. For example, in accordance with some implementations, encoder 854 converts raw image data captured by image sensor 850 into h.264 format.

In some implementations, camera controller 802 includes feedback sub-module 870 for receiving one or more transmission metric(s) (e.g., transmission metric(s) 866 and/or transmission metric(s) 868) and for outputting control signal 874. In some implementations, control signal 874 is utilized by camera controller 802 to set or adjust an encoding bitrate of encoder 854. In some implementations, camera controller 802 includes bandwidth sub-module 872 for setting or adjusting an encoding bitrate of encoder 854 based on control signal 874 and/or external data 878. In some implementations, adjusting the encoding bitrate comprises adjusting one or more of: a frame rate, a frame resolution, and compression. In some implementations, adjusting the encoding bitrate comprises changing an output format of encoded video data 860.

In some implementations, external data 878 includes priority information for the camera, talkback received by the camera, and/or information regarding whether camera software is being updated. In some implementations, bandwidth sub-module 872 sets or adjusts the encoding bitrate based on one or more other factors, such as whether or not motion is being detected by the camera. In some implementations, the one or more other factors include information regarding historical bandwidth availability. For example, historical bandwidth availability based on time of day, time of week, time of month, etc. In some implementations, feedback sub-module 870 and bandwidth sub-module 872 comprise transmissions module 829 (FIG. 8A).

Camera 118 also includes video buffer 862 and network interface 804. Video buffer 862 receives encoded data 860-1 and outputs encoded data 860-2. Video buffer 862 receives encoded video data 860-1 at a first rate based on an encoding bitrate and outputs encoded data 860-2 at a second rate based on network conditions. In some implementations, video buffer 862 has a capacity to store approximately one minute of data at a maximum encoding bitrate. In some implementations, video buffer 862 comprises DRAM. In some implementations, video buffer 862 has a capacity of approximately 8 megabytes. Network interface 804 is utilized to communicate with one or more remote devices (e.g., server system 508) via one or more networks (e.g., one or more networks 162). In some implementations, camera 118 in FIG. 8B is camera 118 in FIG. 8A.

Figure 9A:
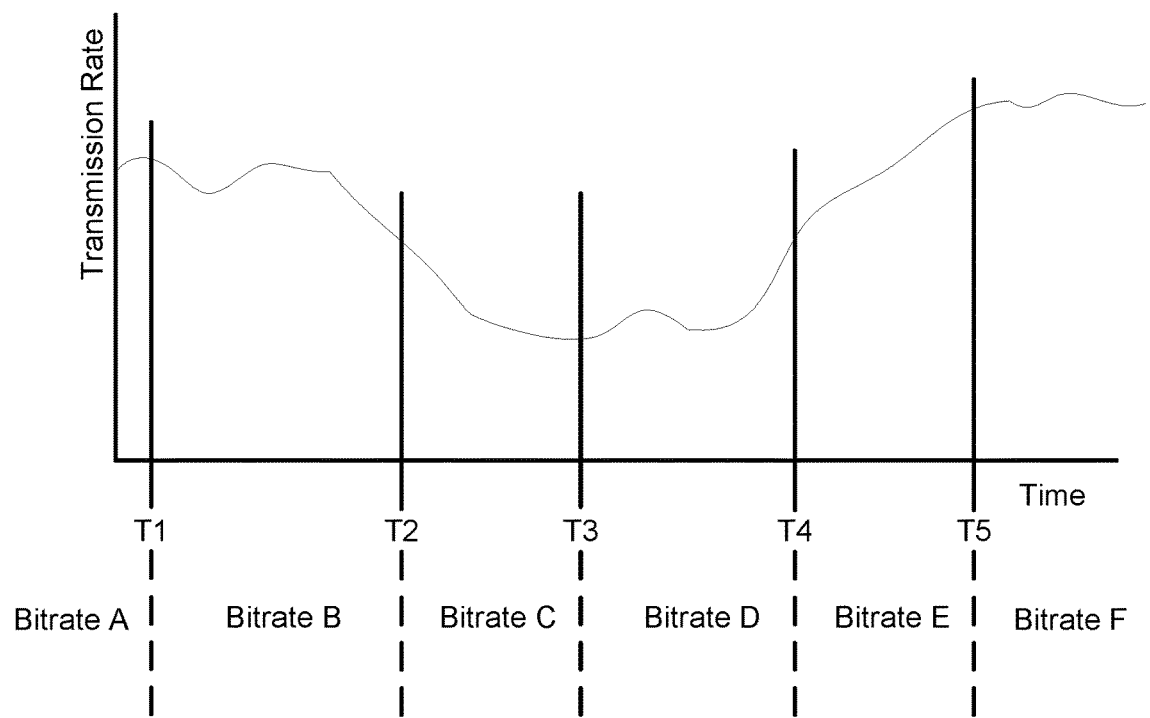
FIGS. 9A-9B are illustrative graphs of example transmission metric and bitrate changes over time in accordance with some implementations.
Figure 9B:
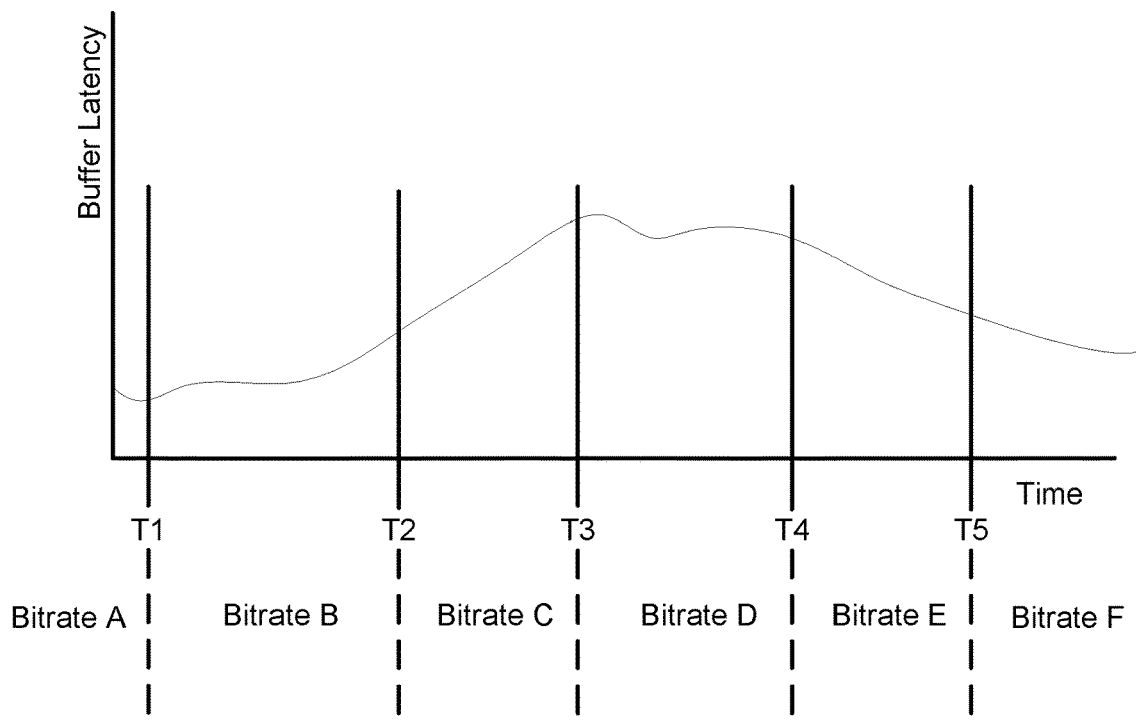

FIGS. 9A-9B illustrate graphs of example transmission metrics and bitrate changes over time in accordance with some implementations. FIG. 9A shows changes in a transmission rate over time for a particular camera device (e.g., camera 118, FIG. 8B).

FIG. 9A also shows corresponding bitrate changes for the camera device. In some implementations, feedback sub-module 870 (FIG. 8B) determines the transmission rate based on transmission metric(s) 866 and/or transmission metric(s) 868. In some implementations, bandwidth sub-module 872 determines a new encoding bitrate based on output by feedback sub-module 870 (e.g., the determined transmission rate) via control 874. In some implementations, bandwidth sub-module 872 transmits the new encoding bitrate to encoder 854 via control 876. In some implementations, encoder 854 adjusts the encoding bitrate to the new encoding bitrate. Initially, the camera device is utilizing a first bitrate, Bitrate A. For example, encoder 854 (FIG. 8B) is generating encoded video data 860 with Bitrate A. At time T1 the camera device adjusts the bitrate to Bitrate B based on the transmission rate over a prior time period (e.g., an average transmission rate over a particular time period). At time T2, the camera device adjusts the bitrate to Bitrate C based on the transmission rate over a prior period (e.g., a period from time T1 to time T2). At time T3, the bitrate is adjusted again to Bitrate D. In some implementations, the encoding bitrate is decreased from Bitrate C to Bitrate D in response to the transmission rate dropping during the period from T2 to T3. At time T4, the bitrate is adjusted to Bitrate E. In some implementations, although the transmission rate increases from T3 to T4, the camera device forgoes adjusting the bitrate at time T4. In some implementations, the encoding bitrate is not increased until the transmission rate improves by more than a determined amount for more than a predetermined amount of time (e.g., more than 30 seconds, 60 seconds, or 90 seconds). At time T5, the bitrate is adjusted to Bitrate F based on the transmission rate over a prior period (e.g., the period between T3 and T5). In accordance with some implementations, the encoding bitrate is increased from Bitrate E to Bitrate F based on the transmission rate increasing during the time period between T4 and T5. In some implementations, the encoding bitrate is adjusted based on the transmission rate at a particular time (e.g., an instantaneous transmission rate). In some implementations, the adjustments to the encoding bitrate are performed by controller 802 (FIG. 8A).

FIG. 9B shows changes in a buffer latency over time for a particular camera device (e.g., camera 118, FIG. 8B). FIG. 9B further shows corresponding bitrate changes for the camera device. In some implementations, feedback sub-module 870 (FIG. 8B) determines the buffer latency based on transmission metric(s) 866 and/or transmission metric(s) 868. In some implementations, bandwidth sub-module 872 determines a new encoding bitrate based on output by feedback sub-module 870 (e.g., the determined buffer latency) via control 874. In some implementations, bandwidth sub-module 872 transmits the new encoding bitrate to encoder 854 via control 876. In some implementations, encoder 854 adjusts the encoding bitrate to the new encoding bitrate. Initially, the camera device utilizes a first bitrate, Bitrate A. For example, encoder 854 (FIG. 8B) is generating encoded video data 860 with Bitrate A. At time T1, the camera device adjusts the bitrate to Bitrate B based on the buffer latency at a particular time (e.g., time T1). At time T2, the camera device adjusts the bitrate to Bitrate C based on the buffer latency at a particular time (e.g., time T2 or a time just prior to T2). At time T3, the camera device adjusts the bitrate to Bitrate D based on the buffer latency at a particular time. At time T4, the camera device adjusts the bitrate to Bitrate E based on the buffer latency at a particular time. At time T5, the camera device adjusts the bitrate to Bitrate F based on the buffer latency at a particular time (e.g., at time T4). In accordance with some implementations, the encoding bitrate is increased from Bitrate E to Bitrate F based on the buffer latency decreasing from time T4 to time T5. In some implementations, the encoding bitrate is adjusted based on a buffer latency during a particular time period (e.g., an average buffer latency over a particular time period). In some implementations, the adjustments to the encoding bitrate are performed by controller 802 (FIG. 8A). In some implementations, the buffer latency is a buffer latency for video buffer 862.

In some implementations, the encoding bitrate is adjusted based on both the transmission rate and buffer latency (also sometimes called behind time). In some implementations, the encoding bitrate is adjusted based on a linear combination of the transmission rate and buffer latency. In some implementations, the encoding bitrate is adjusted in accordance with an encoding metric. In some implementations, the encoding metric is based on a combination of the transmission rate and buffer latency. For example, the encoding metric is calculated in accordance with Equation 1, below.

$$encode\_metric = k_i * buffer\_latency + k_p * transmission\_rate \quad \text{Equation 1}$$

In some implementations, as shown in Equation 1, the encoding metric is a proportional-integral metric measuring whether the camera device has enough available transmission bandwidth (also sometimes called upload bandwidth) for the current encoding bitrate. In some implementations, controller 802 (FIG. 8A) comprises a proportional-integral controller. In some implementations, the encoding metric has buffer net data flow rates as the proportional factor and main stream behind time as the integral factor. Insufficient bandwidth results in positive net data flow (e.g., source rate greater than read rate) and thus leads to increasing behind time. Conversely, zero net data flow and constant behind time indicates a stable state.

In some implementations, when the buffer latency in Equation 1 is positive it indicates that the latency of the video buffer is increasing. In some implementations, when the transmission rate is positive it indicates that the output rate of the video buffer is not keeping pace with the input rate of the video buffer. In some implementations, when the transmission rate is negative it indicates that the output rate exceeds the input rate. In some implementations, when the transmission rate is zero it indicates that the output rate equals the input rate.

In some implementations, the transmission rate is a normalized transmission rate. In some implementations, the transmission rate is normalized by dividing a difference between an input rate and an output rate by the current bitrate. In some implementations, normalization comprises a transmission rate that is independent of the current encoding bitrate and/or current frame resolution. In some implementations, the transmission rate is a relative transmission rate. In some implementations, the transmission rate is relative to the current bitrate and/or current frame resolution. In some implementations, the transmission rate is relative to an input rate or output rate of the video buffer.

In some implementations, the encoding bitrate is adjusted when the encoding metric meets one or more predetermined criteria. For example, in accordance with a determination that the encoding metric is below 10 the encoding bitrate is increased (e.g., increased by 5%, 10%, or 15%). In another example, in accordance with a determination that the encoding metric is above 100, the encoding bitrate is decreased (e.g., decreased by 5%, 10%, or 20%). In some implementations, the encoding bitrate is increased only if the encoding metric meets one or more predetermined criteria and a predetermined amount of time has passed since the bitrate was last adjusted (e.g., 10 seconds, 20 seconds, 60 seconds).

In some implementations, the bitrate adaptation or adjustment is to reduce the encoding bitrate in accordance with a determination that the encoding metric is too high. In some implementations, the bitrate adaptation or adjustment includes periodically increasing the encoding bitrate in accordance with a determination that the available bandwidth would support a higher encoding bitrate.

The following pseudocode example illustrates controller logic for adjusting the encoding bitrate based on one or more transmission metrics:

```
#define MAX_1080_BITRATE 933000
#define MIN_1080_BITRATE 233000
#define MAX_720_BITRATE 400000
#define MIN_720_BITRATE 100000
#define MAX_360_BITRATE 100000
#define MIN_360_BITRATE 25000
UP_BITRATE_COOLDOWN = 10 # time interval to try increasing bitrate
K_P = 400                 # proportional coefficient
K_I = 50                  # integral coefficient
MAX_BITRATE_KBPS = main_stream_backend.get_max_bitrate( )
MIN_BITRATE_KBPS = main_stream_backend.get_min_bitrate( )
up_bitrate_cooldown_left = UP_BITRATE_COOLDOWN
while (true) do
    p = (total_source_rate_kbps - total_read_rate_kbps) /
bitrate # relative net data flow rate
    pi_estimate = K_P * p + K_I *
main_stream_behind_time_sec
    if (pi_estimate > 100) then
        bitrate = math.max(main_stream_read_rate_kbps * 0.9,
MIN_BITRATE_KBPS)
        set_main_stream_bitrate (bitrate)
        up_bitrate_cooldown_left = UP_BITRATE_COOLDOWN
    elif (pi_estimate < 10 and up_bitrate_cooldown_left <=
0) then
        bitrate = math.min(current_encode_bitrate_kbps * 1.15,
MAX_BITRATE_KBPS)
        set_main_stream_bitrate (bitrate)
        up_bitrate_cooldown_left = UP_BITRATE_COOLDOWN
    end
    sleep (1)
    up_bitrate_cooldown_left = up_bitrate_cooldown_left - 1
end
```

In the above logic, the various parameters may be tuned to adjust performance. For example, UP_BITRATE_COOLDOWN is optionally decreased to be more aggressive in exploring bandwidth limit. UP_BITRATE_COOLDOWN is optionally increased to favor a more stable system. K_P is optionally increased to have earlier detection of a bandwidth limit, by increasing sensitivity of positive net data flow. However, in some instances, the rate measurement is noisy and being too sensitive will produce false positives. K_I is optionally increased to have earlier detection of the bandwidth limit, by increasing sensitivity of behind time growth. However, in some instances, controller resource limitations may lead to a small recoverable behind time and being too sensitive will produce false positives. In some instances, adjusting K_I affects the amount of buffer latency that is present in the system.

In some implementations, the above logic is implemented in camera controller 802 (FIG. 8A). In some implementations, the logic is implemented in transmissions module 829 (FIG. 8A).

FIGS. 9C-9D illustrate example video buffers in accordance with some implementations. FIG. 9C shows video buffer 862 storing data 902, 904, 906, 908, and 909. In some implementations, buffer latency is calculated based on how long particular data is stored within video buffer 862. In some implementations, buffer latency is calculated based on an amount of data in video buffer 862. For example, a 60% fill corresponds to a larger buffer latency than a 40% fill.

FIG. 9D shows video buffer 862 storing data with timestamps 910, 911, 912, and 913. In some implementations, the buffer latency is based on the oldest timestamp. In some implementations, the buffer latency is based on the difference between the oldest timestamp and the newest timestamp.

User Interfaces for Video Monitoring

Attention is now directed towards implementations of user interfaces and associated processes that may be implemented on a respective client device 504. In some implementations, client device 504 includes one or more speakers enabled to output sound, zero or more microphones enabled to receive sound input, and a touch screen 1006 enabled to receive one or more contacts and display information (e.g., media content, webpages and/or user interfaces for an application). FIGS. 10A-10E illustrate example user interfaces for monitoring and facilitating review of video data in accordance with some implementations.

Although some of the examples that follow will be given with reference to inputs on touch screen 1006 (where the touch sensitive surface and the display are combined), in some implementations, the device detects inputs on a touch-sensitive surface that is separate from the display. In some implementations, the touch sensitive surface has a primary axis that corresponds to a primary axis on the display. In accordance with these implementations, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some implementations, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 10A-10E show user interface 1008 displayed on client device 504 (e.g., a tablet, laptop, mobile phone, or the like); however, one skilled in the art will appreciate that the user interfaces shown in FIGS. 10A-10E may be implemented on other similar computing devices. The user interfaces in FIGS. 10A-10E are used to illustrate the processes described herein.

For example, the client device 504 is the portable electronic device 166 (FIG. 1) such as a laptop, tablet, or mobile phone. Continuing with this example, the user of the client device 504 (sometimes also herein called a "reviewer") executes an application (e.g., the client-side module 502, FIGS. 5 and 7) used to monitor and control the smart home environment 100 and logs into a user account registered with the smart home provider system 164 or a component thereof (e.g., the video server system 508, FIGS. 5-6). In this example, the smart home environment 100 includes the one or more cameras 118, whereby the user of the client device 504 is able to control, review, and monitor video feeds from the one or more cameras 118 with the user interfaces for the application displayed on the client device 504 shown in FIGS. 10A-10E.

Figure 10A:
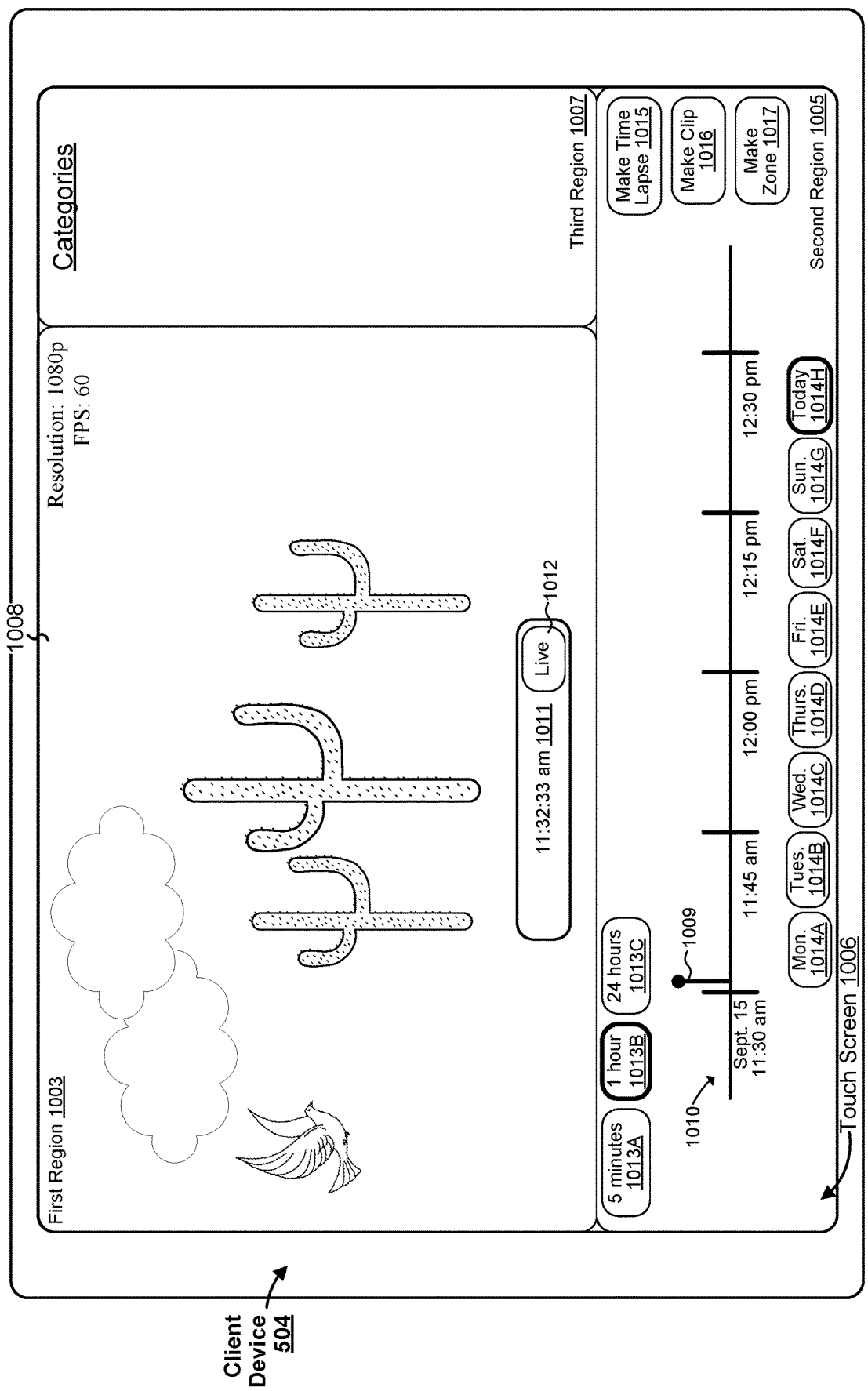
FIGS. 10A-10E illustrate example user interfaces on a client device for monitoring and reviewing video data in accordance with some implementations.

FIG. 10A illustrates the client device 504 displaying a first implementation of a video monitoring user interface (UI) of the application on the touch screen 1006. In FIG. 10A, the video monitoring UI includes three distinct regions: a first region 1003, a second region 1005, and a third region 1007. In FIG. 10A, the first region 1003 includes a video feed from a respective camera among the one or more camera 118 associated with the smart home environment 100. For example, the respective camera is located on the back porch of the user's domicile or pointed out of a window of the user's domicile. The first region 1003 includes the time 1011 of the video feed being displayed in the first region 1003 and also an indicator 1012 indicating that the video feed being displayed in the first region 1003 is a live video feed.

In FIG. 10A, the second region 1005 includes an event timeline 1010 and a current video feed indicator 1009 indicating the temporal position of the video feed displayed in the first region 1003 (i.e., the point of playback for the video feed displayed in the first region 1003). In FIG. 10A, the video feed displayed in the first region 1003 is a live video feed from the respective camera. In some implementations, the video feed displayed in the first region 1003 may be previously recorded video footage. For example, the user of the client device 504 may drag the indicator 1009 to any position on the event timeline 1010 causing the client device 504 to display the video feed from that point in time forward in the first region 1003. In another example, the user of the client device 504 may perform a substantially horizontal swipe gesture on the event timeline 1010 to scrub between points of the recorded video footage causing the indicator 1009 to move on the event timeline 1010 and also causing the client device 504 to display the video feed from that point in time forward in the first region 1003.

In some implementations, event timeline 1010 indicates the transmission quality of the recorded video footage at various times. For example, event timeline 1010 optionally includes indicators for points where recorded video footage is unavailable (e.g., due to poor network conditions, camera resets, and the like). In some implementations, event timeline 1010 includes an overlay denoting time periods when the video feed was not transmitted to the server system. In some implementations, event timeline 1010 includes an overlay indicating the quality of the video footage at particular times, or during particular time periods, such as displaying an FPS value and/or a resolution value. In some implementations, second region 1005 includes an overlay for indicating the quality of video footage at a particular location in the timeline, such as a location corresponding to a cursor and/or a location corresponding to indicator 1009. For example, in accordance with some implementations, a user may view one or more transmission quality statistics by hovering over, or clicking on, a particular portion of, or indicator on, event timeline 1010. In some implementations, event timeline 1010 includes at least one display characteristic (e.g., colored indicators or shading) for indicating the transmission quality of the recorded video footage at particular times, or during particular time periods.

The second region 1005 also includes affordances 1013 for changing the scale of the event timeline 1010: 5 minute affordance 1013A for changing the scale of the event timeline 1010 to 5 minutes, 1 hour affordance 1013B for changing the scale of the event timeline 1010 to 1 hour, and affordance 24 hours 1013C for changing the scale of the event timeline 1010 to 24 hours. In FIG. 10A, the scale of the event timeline 1010 is 1 hour as evinced by the darkened border surrounding the 1 hour affordance 1013B and also the temporal tick marks shown on the event timeline 1010. The second region 1005 also includes affordances 1014 for changing the date associated with the event timeline 1010 to any day within the preceding week: Monday affordance 1014A, Tuesday affordance 1014B, Wednesday affordance 1014C, Thursday affordance 1014D, Friday affordance 1014E, Saturday affordance 1014F, Sunday affordance 1014G, and Today affordance 1014H. In FIG. 10A, the event timeline 1010 is associated with the video feed from today as evinced by the darkened border surrounding Today affordance 1014H. In some implementations, an affordance is a user interface element that is user selectable or manipulatable on a graphical user interface.

In FIG. 10A, the second region 1005 further includes: "Make Time-Lapse" affordance 1015, which, when activated (e.g., via a tap gesture), enables the user of the client device 504 to select a portion of the event timeline 1010 for generation of a time-lapse video clip; "Make Clip" affordance 1016, which, when activated (e.g., via a tap gesture), enables the user of the client device 504 to select a motion event or a portion of the event timeline 1010 to save as a video clip; and "Make Zone" affordance 1017, which, when activated (e.g., via a tap gesture), enables the user of the client device 504 to create a zone of interest on the current field of view of the respective camera. In some embodiments, the time-lapse video clip and saved non-time-lapse video clips are associated with the user account of the user of the client device 504 and stored by the server video server system 508 (e.g., in the video storage database 516, FIGS. 5-6). In some embodiments, the user of the client device 504 is able to access his/her saved time-lapse video clip and saved non-time-lapse video clips by entering the login credentials for his/her for user account.

In FIG. 10A, the video monitoring UI also includes a third region 1007 with a list of categories with recognized event categories and created zones of interest. FIG. 10A also illustrates the client device 504 detecting a contact 1018 (e.g., a tap gesture) at a location corresponding to the first region 1003 on the touch screen 1006.

FIG. 10A further shows a resolution and frames per second (FPS) for the video feed shown in the first region. In FIG. 10A the resolution shown is 1080p and the FPS is 60 at time 11:32:33 am. In some implementations, an encoding bitrate at a particular camera device is adjusted by adjusting the resolution and/or FPS for the video stream. In some implementations, lowering an encoding bitrate comprises lowering the FPS until the FPS reaches a lower threshold (e.g., 30 FPS, 20 FPS, or 15 FPS) then lowering the resolution (e.g., from 1080p to 720p).

Figure 10B:
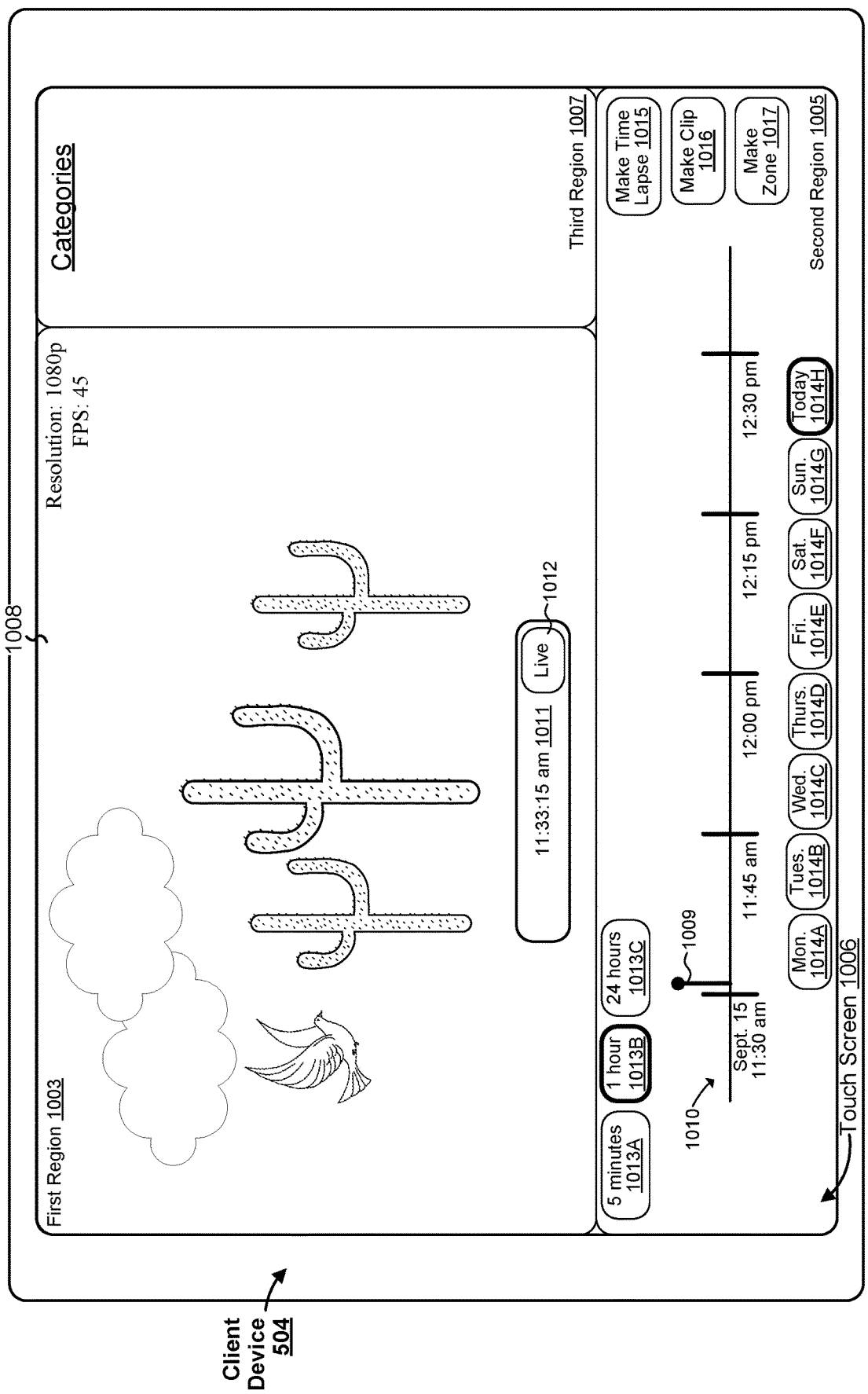
Figure 10C:
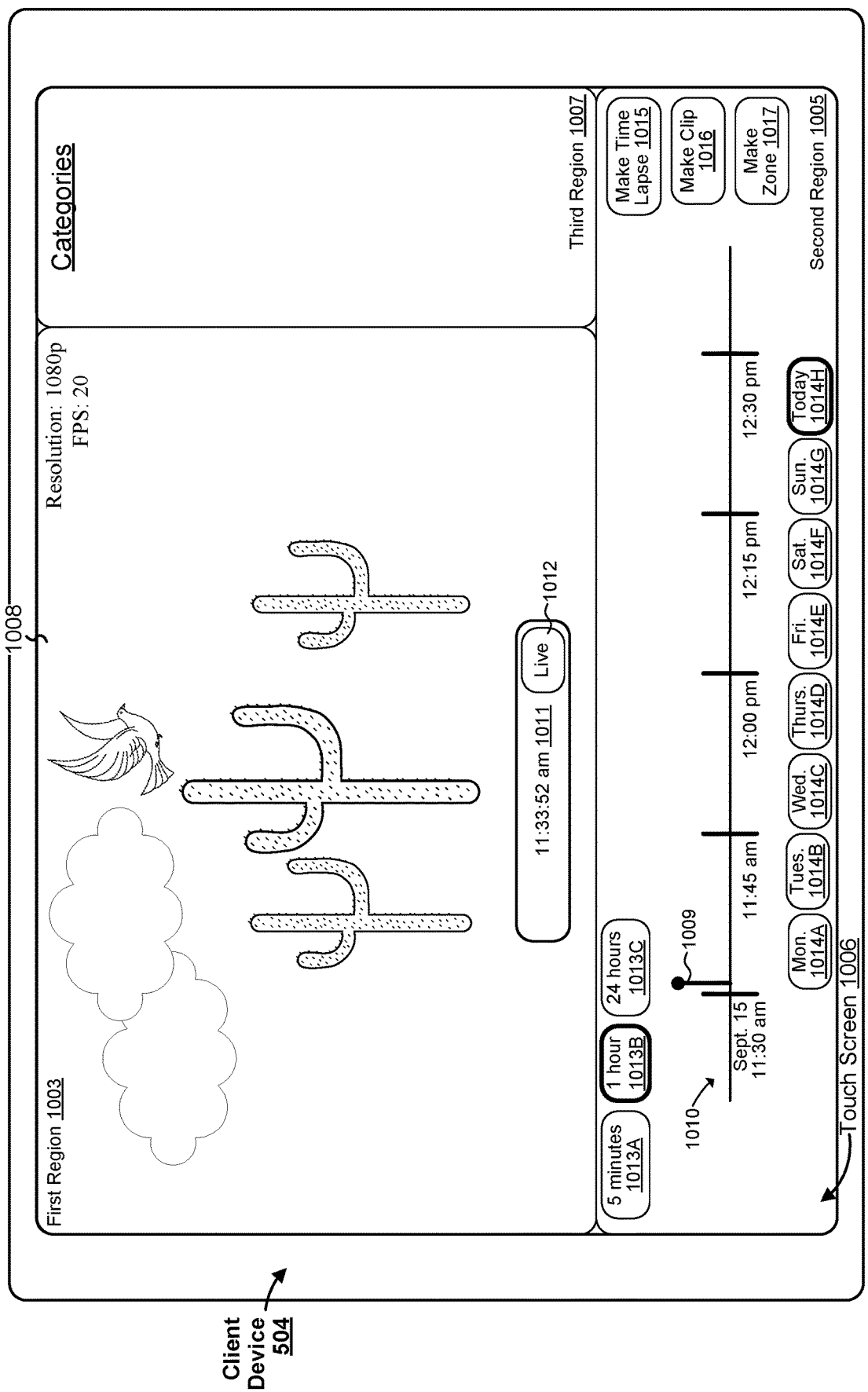
Figure 10D:
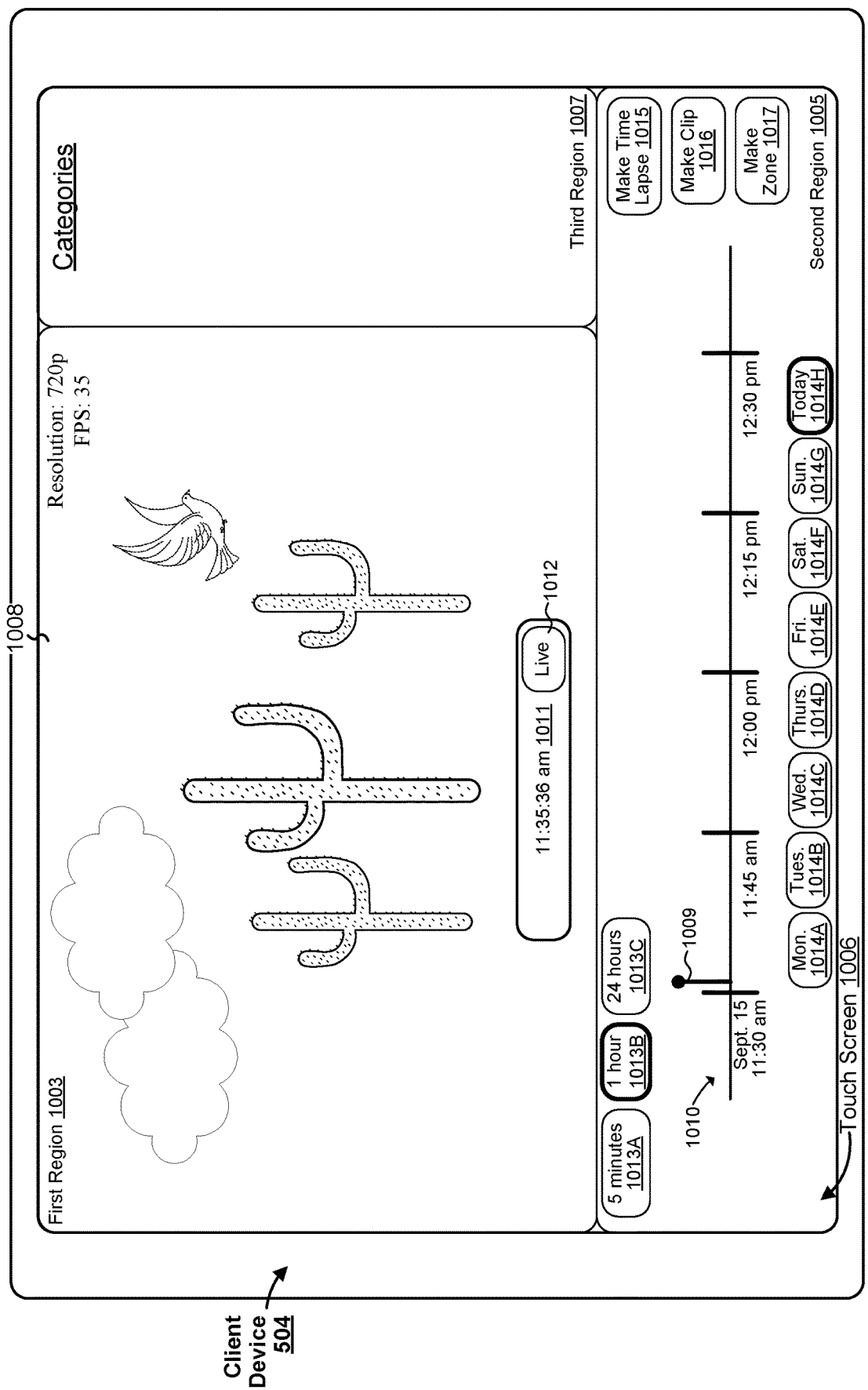
Figure 10E:
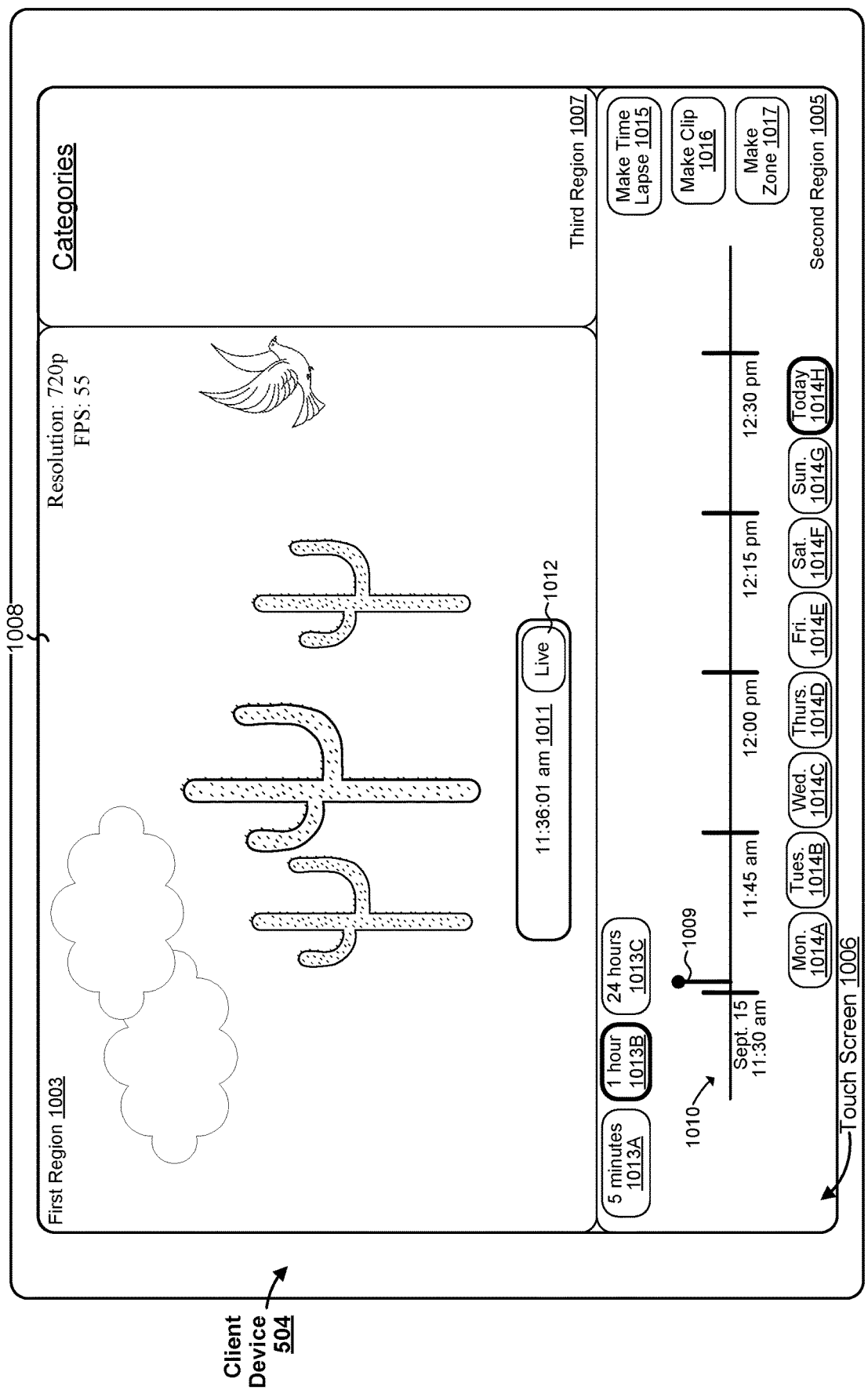

In FIG. 10B the resolution shown is still 1080p but the FPS has decreased to 45 at time 11:33:15 am. In FIG. 10C the resolution shown is still 1080p but the FPS has further decreased to 20 at time 11:33:52 am. In FIG. 10D the resolution has lowered to 720p and the FPS has increased to 35 at time 11:35:36 am. In FIG. 10E the resolution is still 720p and the FPS has increased to 55 at time 11:36:01 am. In accordance with some implementations, the resolution and FPS in FIGS. 10A-10E are adjusted based on network conditions, such as transmission rate and/or buffer latency as shown in FIGS. 9A-9B.

Representative Processes

In some implementations, control and access to the smart home environment 100 is implemented in the operating environment 500 (FIG. 5) with a video server system 508 (FIGS. 5-6) and a client-side module 502 (FIGS. 5 and 7) (e.g., an application for monitoring and controlling the smart home environment 100) is executed on one or more client devices 504 (FIGS. 5 and 7). In some implementations, the video server system 508 manages, operates, and controls access to the smart home environment 100. In some implementations, a respective client-side module 502 is associated with a user account registered with the video server system 508 that corresponds to a user of the client device 504.

Figure 11A:
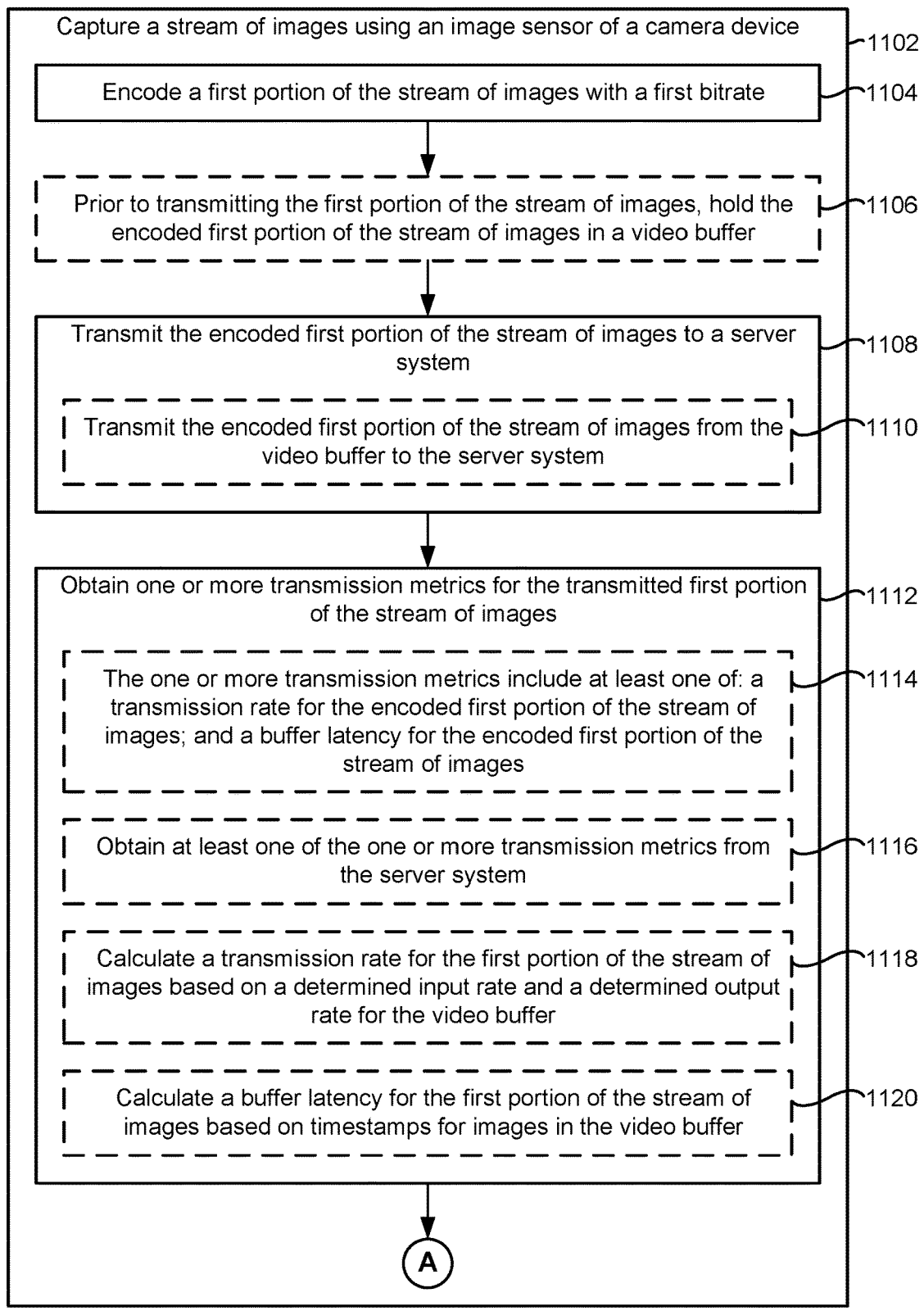
FIGS. 11A-11C illustrate a flowchart of a method of dynamically adapting encoding bitrates in a video stream in accordance with some implementations.
Figure 11B:
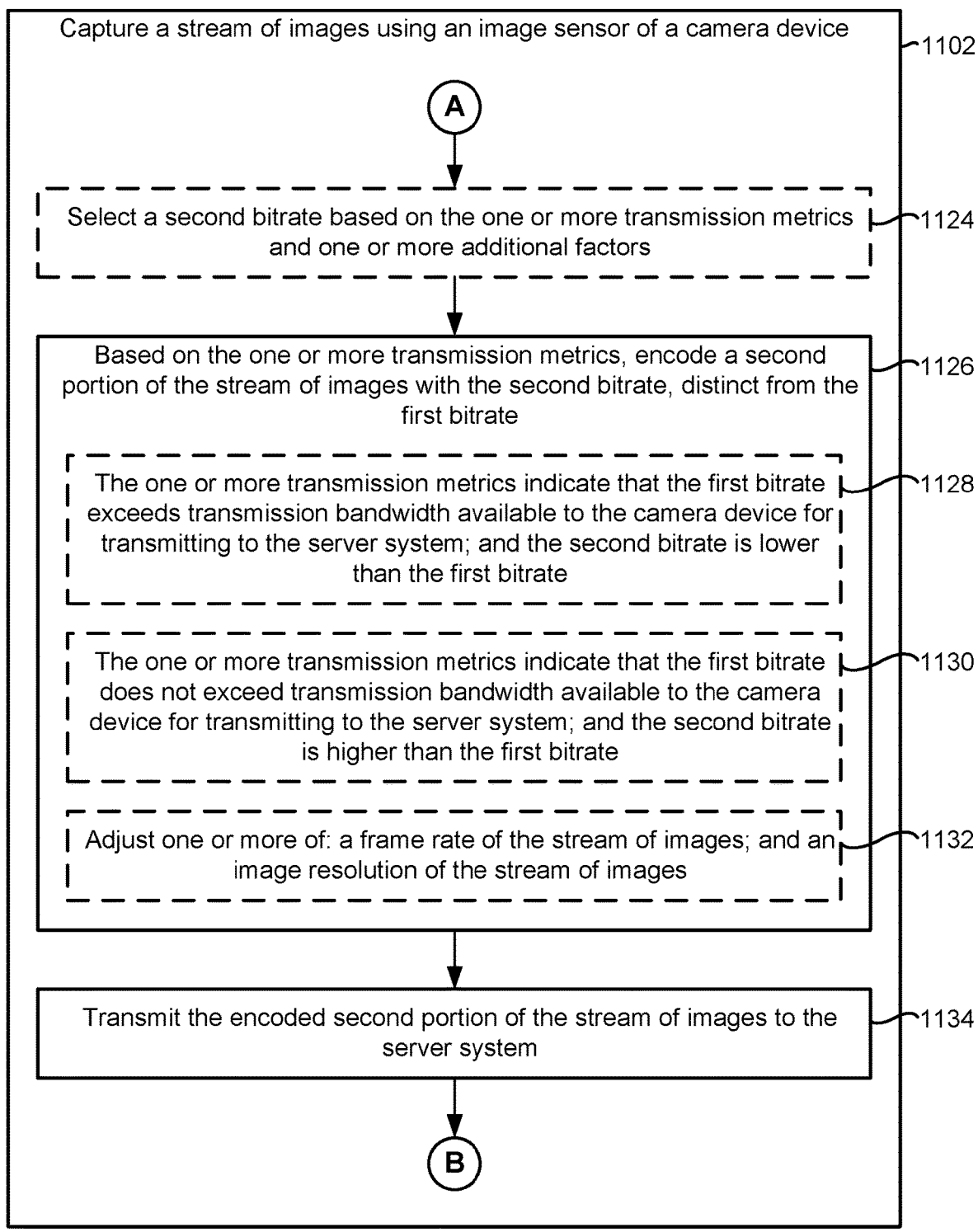
Figure 11C:
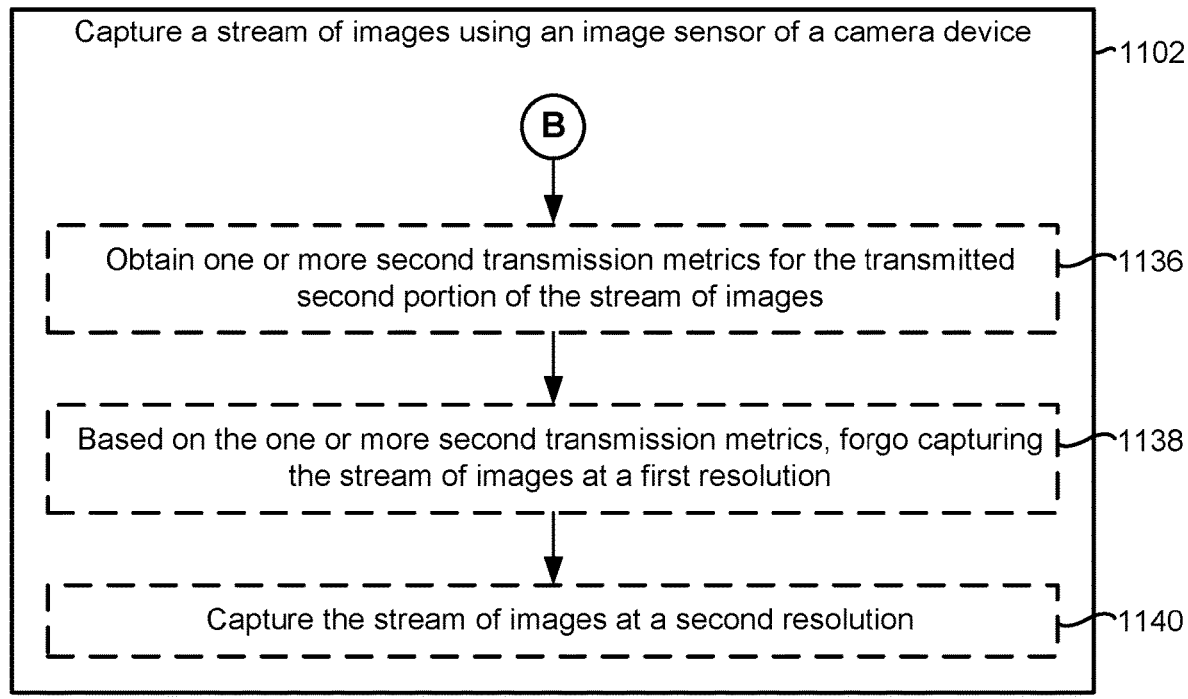

FIGS. 11A-11C illustrate a flowchart diagram of a method 1100 of dynamically adapting encoding bitrates in a video stream in accordance with some implementations. In some implementations, the method 1100 is performed by an electronic device with one or more controllers, memory, and an encoder. For example, in some implementations, the method 1100 is performed by camera device 118 (FIGS. 1 and 8A-8B) or a component thereof (e.g., camera controller 802, FIG. 8A). In some implementations, the method 1100 is governed by instructions that are stored in a non-transitory computer-readable storage medium (e.g., memory 806) and the instructions are executed by one or more controllers of the electronic device (e.g., controllers 802). Optional operations are indicated by dashed lines (e.g., boxes with dashed-line borders).

The camera device captures (1102) a stream of images using an image sensor of the camera device. For example, camera 118 in FIG. 8B captures a stream of images using image sensor 850.

While capturing the stream of images, the camera device encodes (1104) a first portion of the stream of images with a first bitrate. For example, camera 118 in FIG. 8B encodes the first portion of the stream of images (e.g., video data 856) using encoder 854. In some implementations, the encoding includes an h.264 encoding.

In some implementations, prior to transmitting the first portion of the stream of images, the camera device holds (1106) the encoded first portion of the stream of images in a video buffer. For example, camera 118 in FIG. 8B holds the encoded first portion of the stream of images in video buffer 862.

The camera device transmits (1108) the encoded first portion of the stream of images to the server system. For example, camera device 118 in FIG. 8B transmits the stream of images via network interface 804 and network(s) 162 to server system 508 (FIG. 5). In some implementations, the camera device transmits the stream of images to a client device (e.g., client device 504, FIG. 5). In some implementations, the camera device transmits the stream of images to a hub device or other smart device. In some implementations, the stream of images is transmitted utilizing transmission control protocol (TCP). In some implementations, the stream of images is transmitted utilizing a network protocol that acknowledges each packet received. For example, the camera device sends a first packet and will wait for acknowledgement of the first packet at the destination prior to sending a second packet.

In some implementations, the camera device transmits the encoded first portion of the stream of images to a storage system (e.g., a storage system in smart home environment 100, FIG. 1). In some implementations, the camera device transmits the encoded first portion of the stream of images to a storage system in the same smart home network (e.g., smart home network 202, FIG. 2) as the camera device. In some implementations, the camera device transmits the encoded first portion of the stream of images to a storage device (e.g., a DVR, USB drive, or the like). In some implementations, the camera device transmits the encoded first portion of the stream of images to the storage device via a local area network (e.g., a WiFi network). In some implementations, the camera device transmits the encoded first portion of the stream of images to the storage device utilizing a communications module (e.g., communication module 818, FIG. 8A) and/or a communication interface (e.g., communication interface 804, FIG. 8A).

In some implementations, the camera device transmits (1110) the encoded first portion of the stream of images from the video buffer to the server system. For example, camera 118 in FIG. 8B transmits the encoded first portion of the stream of images (e.g., encoded video 860) from video buffer 862 to server system 508 (FIG. 5).

The camera device obtains (1112) one or more transmission metrics for the transmitted first portion of the stream of images. For example, camera 118 in FIG. 8B obtains transmission metrics 866 from video buffer 862 and transmission metrics 868 from network interface 804.

In some implementations, the one or more transmission metrics include (1114) at least one of: a transmission rate for the encoded first portion of the stream of images, and a buffer latency for the encoded first portion of the stream of images. In some implementations, the one or more transmission metrics include a metric for the amount of data stored in the video buffer at a given time or over a given period. In some implementations, the one or more transmission metrics include a combination (e.g., a linear combination) of the transmission rate and the buffer latency. For example, see Equation 1 above. In some implementations, the one or more transmission metrics include a transmission latency metric. In some implementations, the one or more transmission metrics include a behind time metric defined as the difference between the timestamps of the latest and earliest frames currently in the camera device video buffer (e.g., video buffer 862, FIG. 8B). The behind time metric measures the buffering latency on the camera device. In some implementations, the one or more transmission metrics include an adaptation time metric defined as the time it takes for the camera device to recover to a stable streaming state after a drop in available transmission bandwidth. The adaptation time measures the responsiveness of the system. In some implementations, the one or more transmission metrics include a network utilization metric defined as the amount or portion of the available transmission bandwidth utilized by the camera device. In some implementations, in a stable streaming state, the camera device is expected to use most (if not all) of the available transmission bandwidth to achieve the best video quality possible.

In some implementations, the camera device obtains (1116) at least one of the one or more transmission metrics from the server system. For example, camera 118 in FIG. 5 obtains at least one transmission metric from server system 508. In some implementations, the server system determines the at least one transmission metric based on a number of packets received during a particular time interval.

In some implementations, the camera device calculates (1118) a transmission rate for the first portion of the stream of images based on a determined input rate and a determined output rate or the video buffer. For example, a determined input rate for video buffer 862 and a determined output rate for video buffer 862 in FIG. 8B.

In some implementations, the camera device calculates (1120) a buffer latency for the first portion of the stream of images based on timestamps for images in the video buffer. For example, the buffer latency is based on timestamps 910 and 913 in video buffer 862 in FIG. 9D.

In some implementations, the camera device selects (1124) a second bitrate based on the one or more transmission metrics and one or more additional factors. For example, camera 118 in FIG. 8B selects a second bitrate based on transmission metrics 866, transmission metrics 868, and external data 878. In some implementations, the additional factors include: whether or not motion is detected by the camera device, whether or not the image stream output by the camera device is currently being viewed, a priority assigned to the camera device, talkback received by the camera device, whether the camera device is receiving software updates, and the like. In some implementations, the one or more additional factors include information regarding historical bandwidth availability (e.g., based on the time of day, time of week, or priority of the camera device).

Based on the one or more transmission metrics, the camera device encodes (1126) a second portion of the stream of images with the second bitrate, distinct from the first bitrate. For example, the camera device adjusts the encoding bitrate from Bitrate E to Bitrate F as shown in FIG. 9A. In some implementations, display of an event timeline corresponding to the stream of images (e.g., event timeline 1010, FIG. 10A) is adjusted to indicate the adjustment to the encoding bitrate from the first bitrate to the second bitrate. In some implementations, a display characteristic of the event timeline is adjusted to correspond to the adjustment to the encoding bitrate. For example, the event timeline includes an overly coloring that corresponds to particular frame resolutions (e.g., green coloring for 1080p, orange coloring for 720p, and red coloring for lower resolutions) and/or particular FPS ranges (e.g., green coloring for 60+ FPS, orange coloring for 30-59 FPS, and red coloring for lower FPS).

In some implementations, the one or more transmission metrics indicate (1128) that the first bitrate exceeds transmission bandwidth available to the camera device for transmitting to the server system; and the second bitrate is lower than the first bitrate. For example, the camera device adjusts the encoding bitrate from Bitrate B to Bitrate C based on the transmission rate decreasing as shown in FIG. 9A. In some implementations, the camera device decreases the encoding bitrate by a predetermined amount in accordance with a determination that the first bitrate exceeds available transmission bandwidth. For example, the second bitrate is set at 90% of the first bitrate.

In some instances, the transmission bandwidth is limited by local area network bandwidth. In some instances, the transmission bandwidth is limited by a local wireless network (e.g., WiFi) bandwidth. In some instances, the transmission bandwidth is limited by an internet service provider (ISP) or wide area network bandwidth. In some implementations, the bandwidth available to the camera device is determined by a router, modem, cable box, hub device, or other smart device. For example, a router assigns the camera device 50% of the available bandwidth. In some implementations, the amount of bandwidth available to the camera device is based on a priority assigned to the camera device. In some implementations, the priority is assigned based on whether the camera device is detecting motion. In some implementations, the priority is assigned based on whether or not a user is currently viewing the stream of images output by the camera device. In some implementations, the priority is assigned based on one or more user preferences and/or user settings. In some implementations, the priority is assigned based on historical data of the camera device. For example, a camera device that historically detects a lot of motion is prioritized over a camera device that historically does not detect as much motion.

In some implementations, in response to the one or more transmission metrics indicating that the first bitrate exceeds the available transmission bandwidth, a bandwidth assigning device (e.g., a router) assigns more bandwidth to the camera device. For example, the bandwidth assigning device increases the camera device's priority and the increased priority grants the camera device additional bandwidth. In some implementations, the bandwidth assigning device determines whether the available transmission bandwidth is limited by the local area network (e.g., WiFi). In accordance with a determination that the available transmission bandwidth is limited by the local area network, the bandwidth assigning device increases the transmission bandwidth assigned to the camera device. In accordance with a determination that the available transmission bandwidth is not limited by the local area network, the bandwidth assigning device forgoes increases the transmission bandwidth assigned to the camera device.

In some implementations, the one or more transmission metrics indicate (1130) that the first bitrate does not exceed transmission bandwidth available to the camera device for transmitting to the server system; and the second bitrate is higher than the first bitrate. For example, the camera device adjusts the encoding bitrate from Bitrate E to Bitrate F based on the transmission rate increasing as shown in FIG. 9A. In some implementations, the camera device increases the encoding bitrate by a predetermined amount in accordance with a determination that the first bitrate does not exceed available transmission bandwidth. For example, the second bitrate is set at 115% of the first bitrate. In some implementations, the camera device increases the encoding bitrate in accordance with a determination that the first bitrate utilizes less than a predetermined portion of the available transmission bandwidth. In some implementations, the one or more transmission metrics indicate that transmitting at the first bitrate meets one or more predetermined criteria (e.g., is below a bandwidth threshold). In some implementations, after adjusting the encoding bitrate (e.g., increasing or decreasing), the camera device will not increase the bitrate until a predetermined amount of time has elapsed. For example, at time T1, the camera device increases the encoding bitrate based on an increased transmission rate for the camera device. At time T2, the camera device determines that the transmission rate has increased further and, in accordance with that determination, the camera device determines whether a predetermined amount of time has elapsed since time T1. In accordance with a determination that the predetermined amount of time has elapsed, the camera device increases the encoding bitrate. In accordance with a determination that the predetermined amount of time has not elapsed, the camera device forgoes increasing the encoding bitrate. In some implementations, in accordance with the determination that the predetermined amount of time has not elapsed, the camera waits until the predetermined amount of time has elapsed then increases the encoding bitrate.

In some instances, the one or more transmission metrics indicate that the first bitrate does not exceed the transmission bandwidth available. In some implementations, the camera device determines whether the one or more transmission metrics meet one or more predetermined criteria. In accordance with a determination that the one or more transmission metrics meet the predetermined criteria, the camera device increases the encoding bitrate. In accordance with a determination that the one or more transmission metrics do not meet the predetermined criteria, the camera device does not adjust the encoding bitrate.

In some implementations, the camera device adjusts (1132) one or more of: a frame rate of the stream of images; an image resolution of the stream of images; and a compression of the stream of images. For example, FIGS. 10A-10E show the resolution adjusting from 1080p to 720p and the FPS adjusting from 60, to 45, to 20, to 35, to 55. In some implementations, adjusting a frame rate is preferred over adjusting an image resolution.

In some instances, the one or more transmission metrics indicate that the first bitrate exceeds the transmission bandwidth available. In some implementations, the camera device determines whether the encoded frame rate meets one or more predetermined criteria. In accordance with a determination that the encoded frame rate meets the one or more predetermined criteria, the camera device lowers the encoded frame rate. In accordance with a determination that the encoded frame rate does not meet one or more predetermined criteria, the camera device forgoes lowering the encoded frame rate and lowers the encoded image resolution.

The camera device transmits (1134) the encoded second portion of the stream of images to the server system. For example, camera 118 in FIG. 5 transmits the encoded second portion of the stream of images to server system 508. In some implementations, based on the one or more transmission metrics, the camera device determines whether to transmit the encoded second portion of the stream of images to the server system or to a local storage device (e.g., local storage device 190, FIG. 1). In some implementations, in accordance with a determination that the second bitrate exceeds available transmission bandwidth for transmitting the encoded second portion of the stream of images to the server system, the camera device transmits the encoded second portion of the stream of images to a local storage device (e.g., a storage device within smart home environment 100, FIG. 1).

In some implementations, the camera device transmits the encoded second portion of the stream of images to a storage system (e.g., a storage system in smart home environment 100, FIG. 1). In some implementations, the camera device transmits the encoded second portion of the stream of images to a storage system in the same smart home network (e.g., smart home network 202, FIG. 2) as the camera device. In some implementations, the camera device transmits the encoded second portion of the stream of images to a storage device (e.g., a DVR, USB drive, or the like). In some implementations, the camera device transmits the encoded second portion of the stream of images to the storage device via a local area network (e.g., a WiFi network). In some implementations, the camera device transmits the encoded second portion of the stream of images to the storage device utilizing a communications module (e.g., communication module 818, FIG. 8A) and/or a communication interface (e.g., communication interface 804, FIG. 8A).

In some implementations, the camera device obtains (1136) one or more second transmission metrics for the transmitted second portion of the stream of images. For example, camera 118 in FIG. 8B obtains transmission metrics 866 from video buffer 862 and transmission metrics 868 from network interface 804.

In some implementations, based on the one or more second transmission metrics, the camera device forgoes (1138) capturing the stream of images a first resolution.

In some implementations, the camera device captures (1140) the stream of images at a second resolution. In some implementations, the second resolution is lower than the first resolution. For example, the resolution of the video feed in FIG. 10C is 1080p and the resolution in FIG. 10D has been adjusted to 720p. In some implementations, the second resolution is higher than the first resolution.

It should be understood that the particular order in which the operations in FIGS. 11A-11C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1100 described above with respect to FIGS. 11A-11C.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

It will also be understood that, although the terms first, second, etc. are, in some instances, used herein to describe various elements, these elements should not be limited by these terms. These terms are only used to distinguish one element from another. For example, a first user camera could be termed a second camera, and, similarly, a second camera could be termed a first camera, without departing from the scope of the various described implementations. The first camera and the second camera are both cameras, but they are not the same camera.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
   at a camera device having an image sensor, one or more processors, and memory storing one or more programs for execution by the one or more processors:
   encoding a first portion of a captured stream of images from the camera device with a first bitrate;
   transmitting the encoded first portion of the captured stream of images to a server system;
   determining, at the camera device, one or more transmission metrics for the transmitted first portion of the captured stream of images, the one or more transmission metrics including a buffer latency calculated at a video buffer of the camera device for the encoded first portion of the captured stream of images;
   based on the one or more transmission metrics, switching the first bitrate to a second bitrate distinct from the first bitrate and encoding a second portion of the captured stream of images from the camera device with the second bitrate; and transmitting the encoded second portion of the captured stream of images to the server system.

2. The method of claim 1, wherein the one or more transmission metrics further includes:
a transmission rate for the encoded first portion of the captured stream of images.

3. The method of claim 1, further comprising obtaining at least one of the one or more transmission metrics from the server system.

4. The method of claim 1, wherein the camera device includes the video buffer, and the method further comprises, prior to transmitting the first portion of the captured stream of images, holding the encoded first portion of the captured stream of images in the video buffer;
wherein transmitting the encoded first portion of the captured stream of images to the server system comprises transmitting the encoded first portion of the captured stream of images from the video buffer to the server system.

5. The method of claim 4, further comprising:
determining an input rate and an output rate for the video buffer; and
calculating a transmission rate for the first portion of the captured stream of images based on the determined input rate and the determined output rate;
wherein the one or more transmission metrics includes the calculated transmission rate.

6. The method of claim 4, wherein each image in the encoded first portion of the captured stream of images has an associated timestamp, and the method further comprises:
calculating the buffer latency for the first portion of the captured stream of images based on timestamps for images in the video buffer;
wherein the one or more transmission metrics includes the calculated transmission latency.

7. The method of claim 1, wherein the one or more transmission metrics indicate that the first bitrate exceeds transmission bandwidth available to the camera device for transmitting to the server system; and
wherein the second bitrate is lower than the first bitrate.

8. The method of claim 1, wherein the one or more transmission metrics indicate that the first bitrate does not exceed transmission bandwidth available to the camera device for transmitting to the server system; and
wherein the second bitrate is higher than the first bitrate.

9. The method of claim 1, wherein encoding the second portion of the captured stream of images with the second bitrate, distinct from the first bitrate comprises adjusting one or more of:
a frame rate of the stream of images; and
an image resolution of the stream of images.

10. The method of claim 1, further comprising selecting the second bitrate based on the one or more transmission metrics and one or more additional factors.

11. The method of claim 1, wherein capturing the stream of images using the image sensor comprises capturing the stream of images at a first resolution, and the method further comprises:
obtaining one or more second transmission metrics for the transmitted second portion of the captured stream of images;
based on the one or more second transmission metrics, forgoing capturing the stream of images at the first resolution; and
capturing the stream of images at a second resolution.

12. A camera device, comprising:
an image sensor; and
one or more controllers coupled to the image sensor, the one or more controllers configured to:
encode a first portion of the captured stream of images from the camera device with a first bitrate;
transmit the encoded first portion of the captured stream of images to a server system;
determine, at the camera device, one or more transmission metrics for the transmitted first portion of the captured stream of images, the one or more transmission metrics including a buffer latency calculated at a video buffer of the camera device for the encoded first portion of the captured stream of images;
based on the one or more transmission metrics, switching the first bitrate to a second bitrate distinct from the first bitrate and encoding a second portion of the captured stream of images from the camera device with the second bitrate; and
transmit the encoded second portion of the captured stream of images to the server system.

13. The camera device of claim 12, wherein the one or more transmission metrics further includes:
a transmission rate for the encoded first portion of the captured stream of images.

14. The camera device of claim 12, further comprising the video buffer; wherein the one or more controllers are further configured to:
prior to transmitting the first portion of the captured stream of images, hold the encoded first portion of the captured stream of images in the video buffer;
wherein transmitting the encoded first portion of the captured stream of images to the server system comprises transmitting the encoded first portion of the captured stream of images from the video buffer to the server system.

15. The camera device of claim 12, wherein encoding the second portion of the captured stream of images with the second bitrate, distinct from the first bitrate comprises adjusting one or more of:
a frame rate of the stream of images; and
an image resolution of the stream of images.

16. The camera device of claim 12, wherein capturing the stream of images using the image sensor comprises capturing the stream of images at a first resolution, and the one or more controllers are further configured to:
obtain one or more second transmission metrics for the transmitted second portion of the captured stream of images;
based on the one or more second transmission metrics, forgo capturing the stream of images at the first resolution; and
capture the stream of images at a second resolution.

17. A non-transitory computer-readable storage medium storing one or more programs, the one or more programs comprising instructions, which, when executed by a camera device with one or more controllers, cause the camera device to perform operations comprising:
encoding a first portion of the captured stream of images from the camera device with a first bitrate;
transmitting the encoded first portion of the captured stream of images to a server system;
determining, at the camera device, one or more transmission metrics for the transmitted first portion of the captured stream of images, the one or more transmission metrics including a buffer latency calculated at a video buffer of the camera device for the encoded first portion of the captured stream of images;

based on the one or more transmission metrics, switching the first bitrate to a second bitrate distinct from the first bitrate and encoding a second portion of the captured stream of images from the camera device with the second bitrate; and transmitting the encoded second portion of the captured stream of images to the server system.

18. The non-transitory computer-readable storage medium of claim 17, wherein the one or more transmission metrics further includes:

a transmission rate for the encoded first portion of the captured stream of images.

19. The non-transitory computer-readable storage medium of claim 17, wherein the camera device includes the video buffer and; wherein the one or more programs further comprise instructions for:

prior to transmitting the first portion of the captured stream of images, holding the encoded first portion of the captured stream of images in the video buffer;

wherein transmitting the encoded first portion of the captured stream of images to the server system comprises transmitting the encoded first portion of the captured stream of images from the video buffer to the server system.

20. The non-transitory computer-readable storage medium of claim 17, wherein encoding the second portion of the captured stream of images with the second bitrate, distinct from the first bitrate comprises adjusting one or more of:

a frame rate of the stream of images; and an image resolution of the stream of images.

* * * * *